US010504146B2

(12) United States Patent
Lynn

(10) Patent No.: US 10,504,146 B2
(45) Date of Patent: Dec. 10, 2019

(54) METHOD AND SYSTEM FOR DELIVERING ELECTRONIC COMMUNICATIONS

(71) Applicant: Adknowledge, Inc., Kansas City, MO (US)

(72) Inventor: Scott W. Lynn, Kansas City, MO (US)

(73) Assignee: Adknowledge, Inc., Kansas City, MO (US)

( * ) Notice: Subject to any disclaimer, the term of this patent is extended or adjusted under 35 U.S.C. 154(b) by 692 days.

(21) Appl. No.: 14/100,279

(22) Filed: Dec. 9, 2013

(65) Prior Publication Data

US 2014/0095312 A1 Apr. 3, 2014

Related U.S. Application Data

(63) Continuation of application No. 13/369,123, filed on Feb. 8, 2012, now Pat. No. 8,768,767, which is a continuation of application No. 11/350,163, filed on Feb. 8, 2006, now Pat. No. 8,121,895.

(60) Provisional application No. 60/701,368, filed on Jul. 21, 2005.

(51) Int. Cl.
*G06Q 30/00* (2012.01)
*G06Q 30/02* (2012.01)

(52) U.S. Cl.
CPC ......... *G06Q 30/0257* (2013.01); *G06Q 30/00* (2013.01); *G06Q 30/02* (2013.01); *G06Q 30/0214* (2013.01); *G06Q 30/0241* (2013.01)

(58) Field of Classification Search
None
See application file for complete search history.

(56) References Cited

U.S. PATENT DOCUMENTS

| 4,276,597 | A | 6/1981 | Dissly et al. |
| 5,541,835 | A | 7/1996 | Dextraze |
| 5,608,621 | A | 3/1997 | Caveney |
| 5,701,451 | A | 12/1997 | Rogers |
| 5,717,923 | A | 2/1998 | Dedrick |
| 5,724,521 | A | 3/1998 | Dedrick |
| 5,751,956 | A | 5/1998 | Kirsch |
| 5,774,868 | A | 6/1998 | Cragun |

(Continued)

FOREIGN PATENT DOCUMENTS

| EP | 0869652 | 10/1998 |
| WO | 2001/037123 | 5/2001 |
| WO | 2004/051418 | 6/2004 |

OTHER PUBLICATIONS

Anonymous, "Dotster, Inc.; Dotster Sells RevenueDirect to Sedo," Telecommunications Weekly, Atlanta, Mar. 11, 2009, p. 108.

(Continued)

*Primary Examiner* — Eric R Netzloff
*Assistant Examiner* — Dipen M Patel
(74) *Attorney, Agent, or Firm* — Hovey Williams LLP

(57) ABSTRACT

A system directs a browser or browsing application associated with a user to a targeted web site after the user performs at least two activations or "clicks" of his pointing device. The first "click" is typically on a communication provided by the system, serving as an intermediary, and the second "click" is typically on a first data object or web page of the intermediary, before the browser of the user is redirected to a second data object or targeted web page, typically associated with a party unrelated to the party or entity controlling the system.

20 Claims, 23 Drawing Sheets

(56) References Cited

U.S. PATENT DOCUMENTS

| | | | |
|---|---|---|---|
| 5,812,997 | A | 9/1998 | Morimoto |
| 5,826,269 | A | 10/1998 | Hussey |
| 5,918,014 | A | 6/1999 | Robinson |
| 5,937,392 | A | 8/1999 | Alberts |
| 5,963,910 | A | 10/1999 | Ulwick |
| 5,974,398 | A | 10/1999 | Hanson |
| 5,983,227 | A | 11/1999 | Nazem et al. |
| 5,991,735 | A | 11/1999 | Gerace |
| 6,006,197 | A | 12/1999 | d'Eon |
| 6,009,407 | A | 12/1999 | Garg |
| 6,026,368 | A | 2/2000 | Brown |
| 6,049,777 | A | 4/2000 | Sheena |
| 6,075,535 | A | 6/2000 | Fitzhugh |
| 6,078,892 | A | 6/2000 | Anderson |
| 6,115,691 | A | 9/2000 | Ulwick |
| 6,128,624 | A | 10/2000 | Papierniak |
| 6,134,532 | A | 10/2000 | Lazarus |
| 6,144,944 | A | 11/2000 | Kurtzman |
| 6,151,584 | A | 11/2000 | Papierniak |
| 6,189,030 | B1 | 2/2001 | Kirsch |
| 6,199,106 | B1 | 3/2001 | Shaw et al. |
| 6,205,432 | B1 | 3/2001 | Gabbard et al. |
| 6,208,975 | B1 | 3/2001 | Bull |
| 6,216,129 | B1 | 4/2001 | Eldering |
| 6,236,977 | B1 | 5/2001 | Verba |
| 6,298,356 | B1 | 10/2001 | Jawahar et al. |
| 6,321,209 | B1 | 11/2001 | Pasruali |
| 6,360,221 | B1 | 3/2002 | Gough et al. |
| 6,363,383 | B1 | 3/2002 | Kindo |
| 6,411,961 | B1 | 6/2002 | Chen |
| 6,415,294 | B1 | 7/2002 | Niemi |
| 6,448,958 | B1 | 9/2002 | Muta |
| 6,449,635 | B1 | 9/2002 | Tilden, Jr. et al. |
| 6,460,036 | B1 | 10/2002 | Herz |
| 6,477,575 | B1 | 11/2002 | Koeppel |
| 6,490,584 | B2 | 12/2002 | Barrett et al. |
| 6,553,373 | B2 | 4/2003 | Boguraev et al. |
| 6,601,041 | B1 | 7/2003 | Brown |
| 6,615,212 | B1 | 9/2003 | Dutta et al. |
| 6,618,718 | B1 | 9/2003 | Couch |
| 6,622,125 | B1 | 9/2003 | Cragun |
| 6,629,135 | B1 * | 9/2003 | Ross, Jr. ............ G06Q 30/0274 709/218 |
| 6,654,748 | B1 | 11/2003 | Rabung et al. |
| 6,662,215 | B1 | 12/2003 | Moskowitz |
| 6,721,784 | B1 | 4/2004 | Leonard |
| 6,760,916 | B2 | 7/2004 | Holtz |
| 6,778,989 | B2 | 8/2004 | Bates et al. |
| 6,801,945 | B2 | 10/2004 | Lin |
| 6,823,320 | B1 | 11/2004 | Rubin |
| 6,826,594 | B1 * | 11/2004 | Pettersen .......... G06F 17/30893 705/59 |
| 6,839,736 | B1 | 1/2005 | Kajita et al. |
| 6,850,252 | B1 | 2/2005 | Hoffberg |
| 6,868,395 | B1 | 3/2005 | Szlam |
| 6,868,525 | B1 | 3/2005 | Szabo |
| 6,876,974 | B1 | 4/2005 | Marsh et al. |
| 6,883,014 | B1 | 4/2005 | McErlean |
| 6,892,238 | B2 | 5/2005 | Lee |
| 6,904,450 | B1 | 6/2005 | King |
| 6,912,571 | B1 | 6/2005 | Serena |
| 6,915,271 | B1 | 7/2005 | Meyer |
| 6,934,687 | B1 | 8/2005 | Papierniak |
| 6,938,000 | B2 | 8/2005 | Joseph et al. |
| 6,938,050 | B2 | 8/2005 | Le et al. |
| 6,944,611 | B2 | 9/2005 | Flank et al. |
| 6,944,817 | B1 | 9/2005 | Danneels |
| 6,954,731 | B1 | 10/2005 | Montague |
| 6,959,306 | B2 | 10/2005 | Nwabueze |
| 6,968,333 | B2 | 11/2005 | Abbott et al. |
| 6,970,830 | B1 | 11/2005 | Samra |
| 6,973,436 | B1 | 12/2005 | Shkedi |
| 6,978,418 | B1 | 12/2005 | Bain et al. |
| 6,988,096 | B2 | 1/2006 | Gupta et al. |
| 6,993,559 | B2 | 1/2006 | Jilk, Jr. et al. |
| 7,006,979 | B1 | 2/2006 | Samra |
| 7,006,981 | B2 | 2/2006 | Rose |
| 7,013,285 | B1 | 3/2006 | Rebane |
| 7,013,289 | B2 | 3/2006 | Horn et al. |
| 7,047,318 | B1 | 5/2006 | Svedloff |
| 7,050,990 | B1 | 5/2006 | Chu et al. |
| 7,080,030 | B2 | 7/2006 | Eglen et al. |
| 7,103,563 | B1 | 9/2006 | Voisin et al. |
| 7,136,875 | B2 * | 11/2006 | Anderson ............ G06Q 30/02 |
| 7,149,893 | B1 | 12/2006 | Leonard |
| 7,203,684 | B2 | 4/2007 | Carobus et al. |
| 7,268,896 | B2 | 9/2007 | Bellagamba et al. |
| 7,281,042 | B2 | 10/2007 | Hsu et al. |
| 7,299,409 | B2 | 11/2007 | Joshi |
| 7,346,659 | B2 | 3/2008 | Matsuura et al. |
| 7,451,135 | B2 | 11/2008 | Goldman et al. |
| 7,478,089 | B2 | 1/2009 | Henkin et al. |
| 7,493,499 | B1 | 2/2009 | Deaver et al. |
| 7,512,548 | B1 | 3/2009 | Bezos et al. |
| 7,580,980 | B2 | 8/2009 | Kawashima et al. |
| 7,599,852 | B2 | 10/2009 | Bosarge |
| 7,647,387 | B2 | 1/2010 | Bellare et al. |
| 7,707,140 | B2 | 4/2010 | Leishman et al. |
| 7,716,161 | B2 * | 5/2010 | Dean ..................... G06Q 30/02 705/14.49 |
| 7,739,338 | B2 | 6/2010 | Taylor |
| 7,756,933 | B2 | 7/2010 | Reshef et al. |
| 7,904,511 | B2 | 3/2011 | Ryan et al. |
| 7,962,604 | B1 | 6/2011 | Morris et al. |
| 8,121,895 | B2 | 2/2012 | Lynn |
| 8,407,094 | B1 * | 3/2013 | Axe ................... G06Q 30/0251 705/14.73 |
| 2001/0029465 | A1 | 10/2001 | Strisower |
| 2001/0037242 | A1 | 11/2001 | Bataillon |
| 2001/0044745 | A1 | 11/2001 | Shaw |
| 2002/0002488 | A1 | 1/2002 | Muyres et al. |
| 2002/0013785 | A1 | 1/2002 | Miyazaki |
| 2002/0026360 | A1 | 2/2002 | McGregor |
| 2002/0032602 | A1 | 3/2002 | Lanzillo et al. |
| 2002/0035568 | A1 | 3/2002 | Benthin |
| 2002/0065850 | A1 | 5/2002 | Bandu |
| 2002/0082923 | A1 | 6/2002 | Merriman et al. |
| 2002/0083140 | A1 | 6/2002 | Shin |
| 2002/0087631 | A1 | 7/2002 | Sharma |
| 2002/0107931 | A1 | 8/2002 | Singh et al. |
| 2002/0111863 | A1 | 8/2002 | Landesmann |
| 2002/0112013 | A1 | 8/2002 | Walsh |
| 2002/0116476 | A1 | 8/2002 | Eyal et al. |
| 2002/0120589 | A1 | 8/2002 | Aoki |
| 2002/0129002 | A1 | 9/2002 | Alberts et al. |
| 2002/0184238 | A1 * | 12/2002 | Chylla ............... H04N 1/00209 |
| 2002/0194302 | A1 * | 12/2002 | Blumberg ........... G06F 16/9577 709/217 |
| 2003/0004882 | A1 | 1/2003 | Holler et al. |
| 2003/0005052 | A1 | 1/2003 | Feuer et al. |
| 2003/0014539 | A1 | 1/2003 | Reznick |
| 2003/0023487 | A1 | 1/2003 | Day |
| 2003/0033420 | A1 | 2/2003 | Eyal et al. |
| 2003/0037041 | A1 | 2/2003 | Hertz |
| 2003/0083937 | A1 | 5/2003 | Hasegawa |
| 2003/0093319 | A1 | 5/2003 | Jarman |
| 2003/0115099 | A1 | 6/2003 | Burns et al. |
| 2003/0163370 | A1 | 8/2003 | Chen et al. |
| 2003/0171990 | A1 | 9/2003 | Rao |
| 2003/0191689 | A1 | 10/2003 | Bosarge |
| 2003/0195802 | A1 | 10/2003 | Hensen et al. |
| 2003/0233409 | A1 | 12/2003 | Awada et al. |
| 2004/0044566 | A1 * | 3/2004 | Bostelmann ........... G06Q 30/02 705/14.16 |
| 2004/0059712 | A1 | 3/2004 | Dean et al. |
| 2004/0059788 | A1 | 3/2004 | Marcus |
| 2004/0098465 | A1 | 5/2004 | Seo |
| 2004/0122730 | A1 | 6/2004 | Tucciarone et al. |
| 2004/0128293 | A1 | 7/2004 | Maeda |
| 2004/0150673 | A1 | 8/2004 | Dobronsky |
| 2004/0186769 | A1 | 9/2004 | Mangold et al. |
| 2004/0189699 | A1 | 9/2004 | Dobronsky |
| 2004/0199657 | A1 | 10/2004 | Eyal et al. |
| 2004/0215479 | A1 | 10/2004 | Dorsey |

(56) References Cited

U.S. PATENT DOCUMENTS

| | | |
|---|---|---|
| 2004/0225562 A1 | 11/2004 | Turner |
| 2004/0249709 A1 | 12/2004 | Donovan et al. |
| 2005/0005028 A1 | 1/2005 | Huang |
| 2005/0027705 A1 | 2/2005 | Sadri et al. |
| 2005/0076051 A1 | 4/2005 | Carobus et al. |
| 2005/0080685 A1 | 4/2005 | Blum |
| 2005/0108343 A1 | 5/2005 | Collet et al. |
| 2005/0114198 A1 | 5/2005 | Koningstein |
| 2005/0114345 A1 | 5/2005 | Wesinger, Jr. |
| 2005/0132060 A1 | 6/2005 | Mo |
| 2005/0193075 A1 | 9/2005 | Haff et al. |
| 2005/0198170 A1 | 9/2005 | LeMay et al. |
| 2005/0222982 A1 | 10/2005 | Paczkowski et al. |
| 2006/0026497 A1 | 2/2006 | Haenlein et al. |
| 2006/0036608 A1 | 2/2006 | Gutierrez |
| 2006/0036695 A1 | 2/2006 | Rolnik |
| 2006/0047571 A1 * | 3/2006 | Garcia ................. G06Q 30/02 705/14.64 |
| 2006/0047766 A1 | 3/2006 | Spadea |
| 2006/0122883 A1 | 6/2006 | Lynn |
| 2006/0129629 A1 | 6/2006 | Kawashima et al. |
| 2006/0242411 A1 | 10/2006 | Lin |
| 2006/0287919 A1 | 12/2006 | Rubens et al. |
| 2007/0022006 A1 | 1/2007 | Lynn |
| 2008/0040143 A1 | 2/2008 | Freeman et al. |
| 2008/0086356 A1 | 4/2008 | Glassman et al. |
| 2008/0098075 A1 | 4/2008 | O'Bryan et al. |
| 2008/0126495 A1 | 5/2008 | Lynn et al. |
| 2008/0140608 A1 | 6/2008 | Takahashi et al. |
| 2009/0132276 A1 | 5/2009 | Petera |
| 2010/0306249 A1 | 12/2010 | Hill et al. |
| 2011/0112903 A1 | 5/2011 | Goldman et al. |
| 2012/0116791 A1 | 5/2012 | Rose |
| 2012/0117153 A1 | 5/2012 | Gunasekar et al. |
| 2013/0041933 A1 | 2/2013 | Lynn |

OTHER PUBLICATIONS

Blowfish (cipher), Wikipedia, the free encyclopedia, retrieved from http:/en.wikipedia.org/wiki/Blowfish_(cipher) on Jun. 6, 2006, 4 pages.

Clarke III, Irvine, et al., "CAN-SPAM Act: New rules for sending commercial e-mail messages and implications for the sales force," Science Direct, Elsevier, Jan. 21, 2005, 7 pages.

Rivest, R., "The MD5 Message-Digest Algorithm," Memorandum, MIT Laboratory for Computer Science and RSA Data Security, Inc., retrieved from http://www.ietf.org/rfc/rfc1321.txt, Apr. 1992, 20 pages.

Shao, Weiguang, et al., "An Agent Architecture for Supporting Individualized Services in Internet Applications," IEEE, 1998, pp. 140-147.

STIC Search Report, EIC 3600, Jun. 29, 2011, 260 pages.

Thibodeau, Patrick, "Domain Name System Shows Signs of Stress," Computerworld, vol. 41, No. 16, Apr. 16, 2007, ABI/INFORM Global, p. 1.

\* cited by examiner

METHOD AND SYSTEM FOR DELIVERING ELECTRONIC COMMUNICATIONS

RELATED APPLICATIONS

This application is Continuation of Commonly Owned U.S. patent application Ser. No. 13/369,123, entitled: Method and System for Delivering Electronic Communications, filed on Feb. 8, 2012, which is Continuation of Commonly Owned U.S. patent application Ser. No. 11/350,163, entitled: Method and System for Delivering Electronic Communications, filed on Feb. 8, 2006, now, U.S. Pat. No. 8,121,895, which is related to and claims priority from U.S. Provisional Patent Application Ser. No. 60/701,368, entitled: Method And System For Delivering Behaviorally Targeted "Two Click" Advertisements Over A Network Based On Keywords, filed on Jul. 21, 2005, the disclosures of both patent applications are incorporated by reference herein.

BACKGROUND OF THE INVENTION

Electronic advertising over networks, such as the Internet, takes various forms. One such form is, for example, advertising via electronic mail (e-mail). E-mail based advertising is now regulated by the Controlling the Assault of Non-Solicited Pornography and Marketing Act of 2003 (the "CAN-SPAM Act"), 15 U.S.C. § 7701, et seq. The CAN-SPAM Act includes provisions that require the sender of an unsolicited commercial e-mail message to honor the request of a recipient to be unsubscribed from further e-mail transmissions of the sender, within ten days of the request. The CAN-SPAM Act only regulates the transmission of commercial electronic mail (E-mail). It does not regulate banners.

Producers and service providers may administer their e-mail advertising themselves, or outsource some or all of their e-mail advertising campaign to various agencies or intermediaries. Outsourcing is typically done for economic reasons, to save on costs and liabilities associated with e-mail advertising. Additionally, the intermediaries are more familiar with the Internet, and have access to multitudes of potential recipients.

However, as a result of using intermediaries, the producers and service providers may be unaware of the identity or e-mail address of the e-mail advertisements' recipients. If a recipient no longer wants to receive such promotions, the recipient so informs the intermediary, which is responsible for the e-mail advertisements' transmission, and is in the best position to timely halt further transmissions.

Compliance with the CAN-SPAM Act is relatively straightforward for a producer or service provider that advertises on its own through the transmission of e-mail. However, when the producer or service provider outsources their advertising to intermediaries, there may be confusion as to who is the "sender." This is because the CAN-SPAM act defines the sender of the e-mail advertisement as the party that initiates the email transmission and that is advertising its own goods or services in the requisite e-mail transmission. 15 U.S.C. § 7702(16).

Those advertisers, who outsourced their advertising to intermediaries in an attempt to absolve themselves of liability under the CAN-SPAM Act, may still be concerned that they are the "sender." This is because the intermediary is not advertising the intermediaries' services, but promoting the goods and services of the advertiser, whereby the advertiser, rather than the intermediary, may be treated as the sender of the e-mail under the CAN-SPAM Act. Moreover, this may be true even though the intermediary is actually sending the e-mail advertisement to recipients typically unknown to the party who outsourced the advertising to the intermediary.

SUMMARY OF THE INVENTION

This document references terms that are used consistently or interchangeably herein. These terms, including variations thereof, are as follows.

The term "click", "clicks", "click on", "clicks on" involves the activation of a computer pointing apparatus, such as a device commonly known as a mouse, on a location on a computer screen display, for example, an activatable link, that causes an action of the various software and or hardware supporting the computer screen display.

A banner is a graphic that appears on the monitor of a user, typically over a web page being viewed. A banner may appear on the web page in forms such as inserts, pop ups, roll ups, scroll ups, and the like.

A "web site" is a related collection of World Wide Web (WWW) files that includes a beginning file or "web page" called a home page, and typically, additional files or "web pages". The term "web site" is used collectively to include "web site" and "web page(s)".

A uniform resource locator (URL) is the unique address for a file, such as a web site or a web page, that is accessible on the Internet.

A server is typically a remote computer or remote computer system, or computer program therein, that is accessible over a communications medium, such as the Internet, that provides services to other computer programs (and their users), in the same or other computers.

Pay Per Click (PPC), also known as price per click and cost per click, as used herein, is the amount of money that an advertiser, web site promoter, or other party who owns or is associated with a web site, will pay to a system administrator for providing their advertisement, listing, link or the like to a user, and the user clicks their mouse or pointing device on the advertisement, listing, link or the like, such that the user's browser is directed to the targeted web site associated with the advertiser, web site promoter, or other party who owns or is associated with the targeted web site.

"n" and "nth" in the description below and the drawing figures represents the last member of a series or sequence of servers, components, listings, links, data files, etc.

"Click through" or "click throughs" are industry standard terms for a user clicking on a link in an electronic object, such as an e-mail, banner, listing on a web site, for example, a web site of a search engine, or the like, and ultimately having their browser directed to the targeted data object, typically a web site, associated with the link.

The present invention overcomes the problems of the contemporary art by providing a system, where a user, upon receiving an electronic communication from the system, typically an advertisement, performs at least two activations or "clicks" of their pointing device before reaching the targeted data object or web page, associated with the advertisement. The first "click" is typically on a generic advertisement, provided by the system, serving as an intermediary (which is generic or not branded with the marks of any specific advertiser), and the second "click" is typically on a first data object or web page of the intermediary, before the browser or browsing application of the user is redirected to a second data object or targeted web page, typically associated with the advertiser, for whom the intermediary controls the system that is administering the communication or advertising campaign. As a result of this method and system, the advertiser is not the "sender" of the e-mail advertisement, as such advertisement does not contain the marks or brand of any particular advertiser, and accordingly, the advertiser can not be a "sender" under the provisions of the CAN-SPAM Act.

An embodiment of the invention is directed to a method for delivering electronic content to at least one user. The method includes, providing a first data object to at least one user in response to the at least one user activating a link in an electronic communication provided to the at least one user, the at least one first data object including at least one link to at least one second data object. This is followed by directing the browser of the at least one user to the at least one second data object when the at least one link corresponding to the second data object in the first data object is activated. The first data object is, for example, a web page, typically from the system administering the electronic communication, and the second data object is, for example, a web site or web page outside of the system or network. The electronic communications may be, for example, electronic mails (e-mails) or banners.

Another embodiment of the invention is directed to a method for directing a recipient of an electronic communication to a target data object. The method includes, causing the recipient to activate at least two activatable electronic objects, and, after the second electronic object has been activated, providing electronic access to the target data object to the browsing application associated with the recipient of the electronic communication.

Another embodiment of the invention is directed to a method for directing a recipient of an electronic communication to a target data object. The method includes, providing an activatable electronic communication for the recipient, providing at least one landing page for the browsing application associated with the recipient to be directed to, when the electronic communication has been activated, and, obtaining at least one link for placement into the at least one landing page, the link to the target data object, when the electronic communication has been activated. The activatable electronic communication is, for example, an electronic mail (e-mail) or a banner.

Another embodiment of the invention is directed to a system for directing a browsing application associated with a recipient of an electronic communication to a target data object. The system includes three components. There is a first component that provides an activatable electronic communication for the recipient. The activatable electronic communication is, for example, an electronic mail (e-mail) or a banner. There is a second component that provides at least one landing page for the browsing application associated with the recipient to be directed to, in response to receiving at least one indication that the electronic communication has been activated. A third component is for obtaining at least one link for placement into the at least one landing page, the link to the target data object, when the electronic communication has been activated.

Another embodiment of the invention is directed to a programmable storage device readable by a machine, tangibly embodying a program of instructions executable by a machine to perform method steps for directing a browsing application. The method steps are selectively executed during the time when the program of instructions is executed on said machine, and include, providing an activatable electronic communication for a recipient, the electronic communication being in the form of, for example, electronic mails (e-mails) or banners. At least one landing page is provided for the browsing application associated with the recipient to be directed to, in response to receiving at least one indication that the electronic communication has been activated, and, obtaining at least one link for placement into the at least one landing page, the link to the target data object, when the electronic communication has been activated. The landing page is, for example, a data object, such as a web page, from the system administering the electronic communication, and the target data object is, for example, a web site or web page outside of the system or network.

Another embodiment of the invention is directed to a programmable storage device readable by a machine, tangibly embodying a program of instructions executable by a machine to perform method steps for directing a browsing application. The method steps are selectively executed during the time when the program of instructions is executed on said machine, and include, providing an activatable banner for a recipient. At least one landing page is provided for the browsing application associated with the recipient to be directed to, in response to receiving at least one indication that the banner has been activated, and, obtaining at least one link for placement into the at least one landing page, the link to the target data object, when the banner has been activated. The landing page is, for example, a data object, such as a web page, from the system administering the electronic communication, and the target data object is, for example, a web site or web page outside of the system or network.

Another embodiment of the invention is directed to a method for directing a recipient of a banner to a target data object. The method includes, providing an activatable banner to a recipient, providing at least one landing page for the browsing application associated with the recipient to be directed to, when the banner has been activated, and, obtaining at least one link for placement into the at least one landing page, the link to the target data object, when the banner has been activated.

BRIEF DESCRIPTION OF DRAWINGS

Attention is now directed to the drawings, where like reference numerals or characters indicate corresponding or like components. In the drawings.

DETAILED DESCRIPTION

Throughout this document, textual and graphical references are made to fictional trademarks as well as Internet addresses (Uniform Resource Locators, also known as URLs). These trademarks and Internet addresses are fictitious and for explanation purposes only, and any association with any party or other entity is coincidental, unintentional and unrelated thereto. Throughout this document, numerous textual and graphical references are made to trademarks. These trademarks are the property of their respective owners, and are referenced only for explanation purposes herein.

The invention includes a system that directs a browser or browsing application associated with a user to a targeted data object, typically a web site or web page, after the user performs at least two activations or "clicks" of his pointing device. The first "click" is typically on a communication or provided by the system, serving as an intermediary, and the second "click" is typically on a first data object or web page of the intermediary, before the browser of the user is redirected to the second data object or targeted web site or page, typically associated with a party unrelated to the enterprise, party or entity, or the like, that controls the system.

Figure 1A:
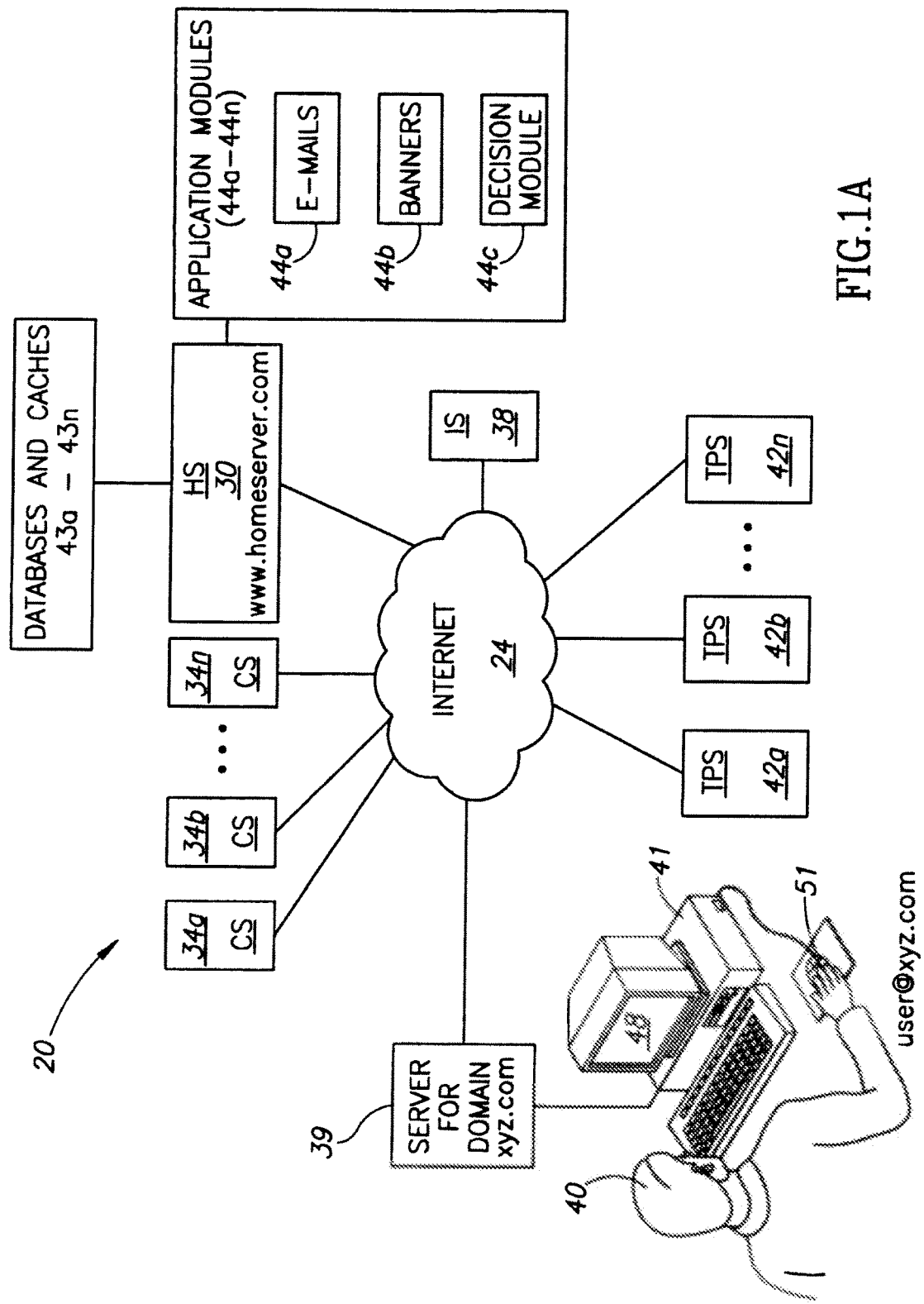
FIG. 1A is a diagram of an exemplary system on which an embodiment of the invention is performed.

FIG. 1A shows the present invention in an exemplary operation. The present invention employs a system 20, formed of various servers and server components, that are linked to a network, such as a wide area network (WAN), that may be, for example, the Internet 24.

There are, for example, at least three kinds of servers that form the system 20. These servers typically include a Home Server (HS) 30, one or more servers (CS) 34a-34n associated with content providers, and an imaging server (IS) 38. These servers 30, 34a-34n and 38 are linked to the Internet 24, so as to be in communication with each other. The servers 30, 34a-34n and 38 include multiple components for performing the requisite functions as detailed below, and the components may be based in hardware, software, or combinations thereof. The servers 30, 34a-34n and 38 may also have internal storage media and/or be associated with external storage media.

The servers 30, 34a-34n, 38 of the system 20 are linked (either directly or indirectly) to an endless number of other servers and the like, via the Internet 24. Other servers, exemplary for describing the operation of the system 20, include a domain server 39 for the domain (for example, the domain "xyz.com") of the user 40 (for example, whose electronic mail (e-mail) address is user@xyz.com), linked to the computer 41 of the user. Still other servers may include third party servers (TPS) 42a-42n, controlled by content providers, web site promoters, and the like. The advertising or informational campaigns, that will utilize content from the content servers (CS) 34a-34n, that provide links to the third party servers (TPS) 42a-42n, is typically administered by the party or entity controlling the home server (HS) 30.

While various servers have been listed, this is exemplary only, as the present invention can be performed on an endless numbers of servers and associated components, that are in some way linked to a network, such as the Internet 24. Additionally, all of the aforementioned servers include components for accommodating various server functions, in hardware, software, or combinations thereof, and typically include storage media, either therein or associated therewith. Also in this document, the aforementioned servers, storage media, and components can be linked to each other or to a network, such as the Internet 24, either directly or indirectly.

The Home Server (HS) 30 is of an architecture that includes components, such as databases and caches 43a-43n modules 44a-44n (some modules 44a-44c specifically shown and discussed) and the like, for handling numerous operations and applications. The home server (HS) 30 is shown for example, as a single server, but it may be made up of numerous servers along the public network (i.e., the Internet 24) or along a local network, or combinations thereof. The databases and caches 43a-43n and modules may be in single or separate components, as described for the home server (HS) 30.

One such operation and application of many, performed by the home server (HS) 30, includes electronic mail, and performing associated electronic mail (e-mail) functionalities (an e-mail module 44a), such as recording clicks to open and respond to the electronic mail, as well as record click throughs to targeted web sites. The architecture also includes components for providing numerous additional server functions and operations, for example, comparison and matching functions, policy and/or rules processing, various search, distribution optimization functions (as detailed below) and other operational engines.

Similar to the e-mail functionalities listed above, the home server (HS) 30 may also include an architecture (including databases and caches 43a-43n and modules 44, for supporting banners 44b and other electronic communications. The architecture includes components, modules and the like, for handling banners, to perform banner server functionality, including banner applications.

While caches 43a-43n and databases are shown, this is exemplary only, for explanation purposes. The Home Server (HS) 30 may be associated with additional caches, databases, as well as numerous other additional storage media, both internal and external thereto.

Figure 1B:
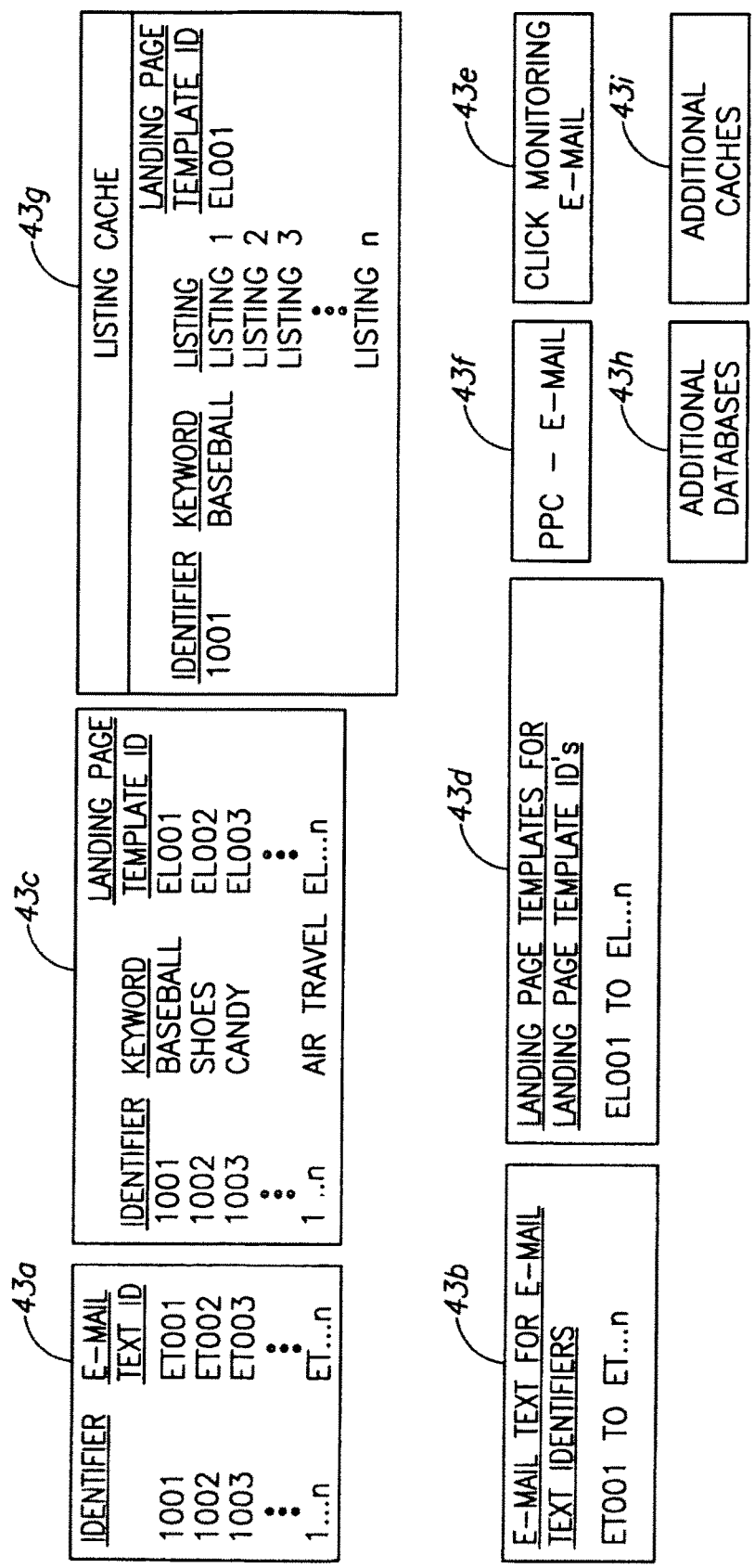
FIGS. 1B and 1C are diagrams of exemplary databases for FIG. 1A.
Figure 1C:
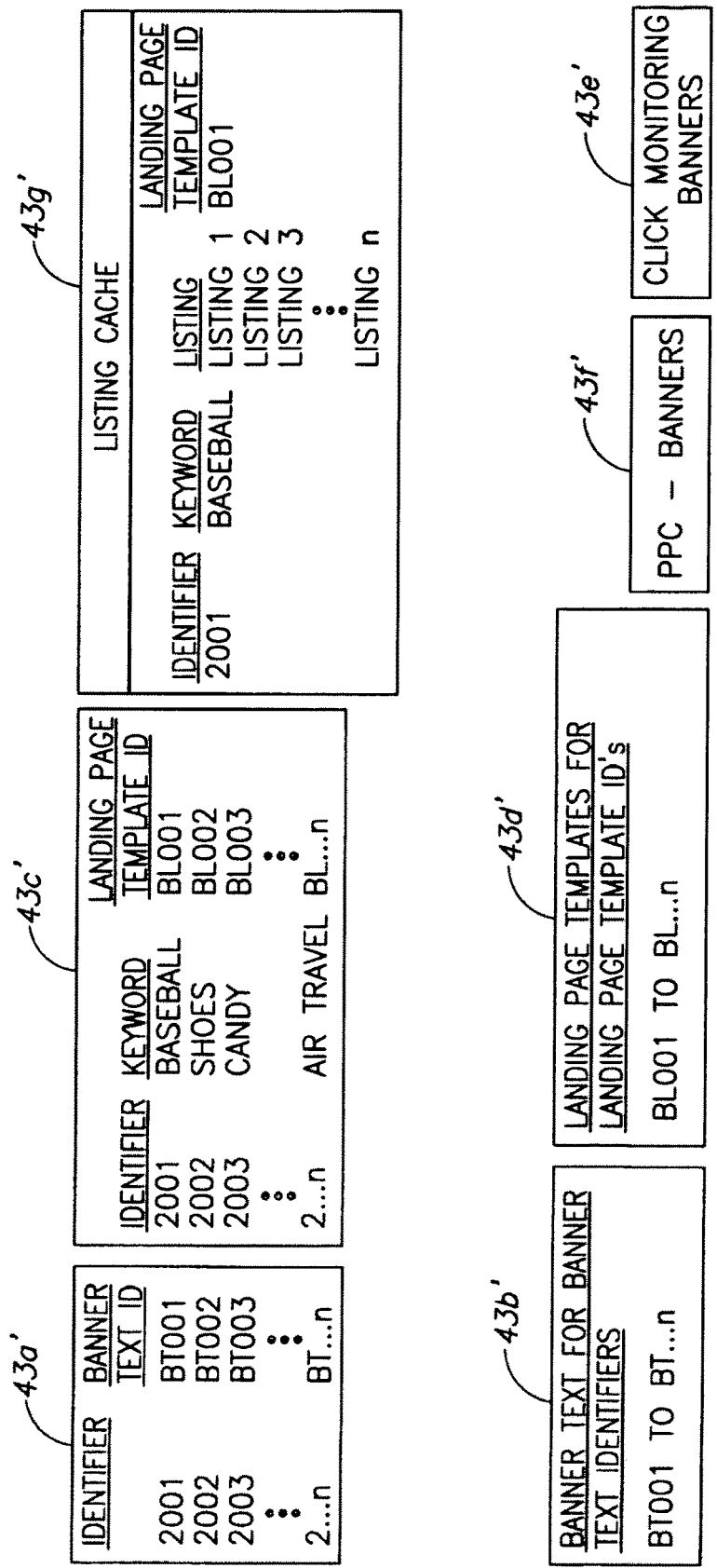

The Home Server (HS) 30 includes various processors, including microprocessors, for performing the aforementioned server functions and operations. It also includes storage media, either internal or associated therewith, such as databases and caches 43a-43n. FIGS. 1B and 1C, detailed below, shows diagrams of the databases and caches 43a-43n, with some databases and cashes specifically shown and discussed. The databases and caches may also include other data structures for data storage and manipulation.

In addition to the e-mail 44a and banner 44b modules, discussed above, another module that operates in conjunction with the e-mail 44a and banner 44b modules is a decision module 44*c*. The decision module 44*c* may be programmed to randomly send e-mails and banners. However, it may also be programmed to send the specific e-mail or banner in accordance with a behavioral analysis of the recipient of the e-mail or banner, who has responded to the e-mail or banner. For example, this module 44*c* analyzes the time between the sending of the e-mail or banner and the response, the time of day the response, whether the recipient has responded to other sent e-mails and banners and whether or not they clicked through to the targeted web page, in the case of banners, the web site or web page being browsed, the PPC value for various web sites, and other factors. The module 44*c* may also perform a distribution optimization function (DOF), as detailed in commonly owned U.S. patent application Ser. No. 11/294,188, entitled: Method and System for Generating and Distributing Electronic Communications for Maximizing Revenue, the disclosure of which is incorporated by reference herein.

The Home Server (HS) 30 composes and sends e-mails to intended recipients (for example, e-mail clients hosted by a computer, workstation or other computing device, etc., associated with a user), over the network, typically a wide area network (WAN), such as the Internet. The home server (HS) 30 receives responses and other communications sent from the e-mail clients associated with the computer of a user. The e-mail clients may be, for example, America Online® (AOL®), Outlook®, Eudora®, or other web-based clients. In this document, the client is an application that runs on a computer, workstation or the like and relies on a server to perform some operations, such as sending and receiving e-mail. Also, for explanation purposes, the Home Server (HS) 30 may have a uniform resource locator (URL) of, for example, www.homeserver.com. The process of sending the request from the home server (HS) 30 and returning the request to the home server (HS) 30, is further detailed below.

For example, the intended recipient or user 40 has a computer 41 (such as a multimedia personal computer with a Pentium® CPU, that employs a Windows® operating system), that uses an e-mail client. The computer 41 is linked to the Internet 24.

Content servers (CS) 34*a*-34*n* may include servers that perform search engine functions and the like, for example, based on one or more words, commonly known as keywords. For example, these servers 34*a*-34*n*, representative of a multitude of content servers, provide content, typically in text form, typically of listings that cover links to targeted web sites. The text is for the imaging server (IS) 38 to convert to an image, with the text delivered to the imaging server (IS) 38 typically through the Home server (HS) 30 or directly from the content server (CS) 34*a*-34*n*, as detailed further below. The content servers (CS) 34*a*-34*n*, typically perform their functions in response to a request from the Home Server (HS) 30, based on a designated keyword(s). These content servers (CS) 34*a*-34*n* may be, for example, Pay-Per-Click (PPC) servers of various content providers, such as internal providers, or external providers.

At least one imaging server (IS) 38 is linked to the Internet 24. The imaging server (IS) 38 functions to convert text (data in text format) from the content servers (CS) 34*a*-34*n*, as received through the Home Server (HS) 30, to an image (data in an image format). After conversion into an image, the image is typically sent back to the Home Server (HS) 30, to be placed into a template for a landing page (typically a web page administered by the home server (HS) 30), in response to an electronic communication, for example, an e-mail or banner, being "clicked" on or activated by a user.

Figure 2A:
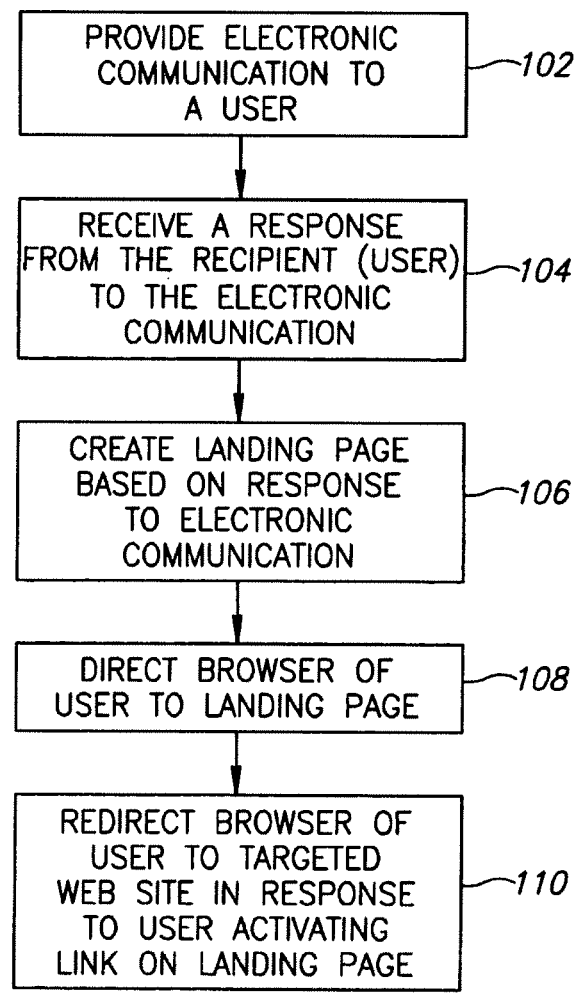
FIG. 2A is a flow diagram of a process in accordance with an embodiment of the invention.
Figure 2B:
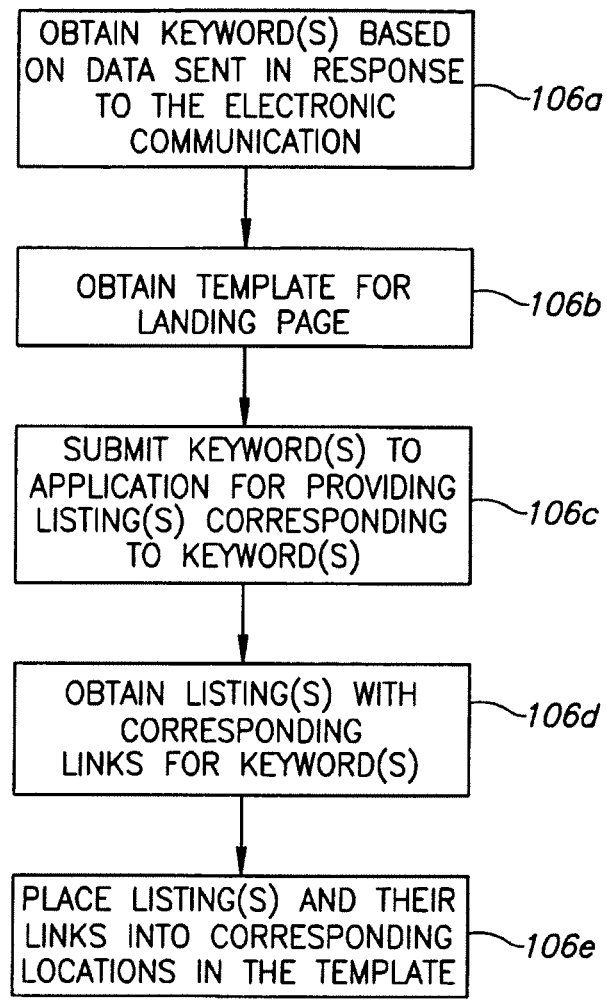
FIG. 2B is a detailed flow diagram of the creation of the landing page of FIG. 2A.

Turning also to FIGS. 2A and 2B, an exemplary implementation of a process in accordance with an embodiment of the present invention will now be described. Specifically, FIG. 2A is the overall process, while FIG. 2B is a detailed flow diagram of the process of creating the landing page of FIG. 2A.

Turning to FIG. 2A, at block 102, an electronic communication is provided to a user. The electronic communication is typically sent from the home server (HS) 30 or a server or other apparatus affiliated therewith, and may be, for example, an e-mail, or a banner.

Figure 3:
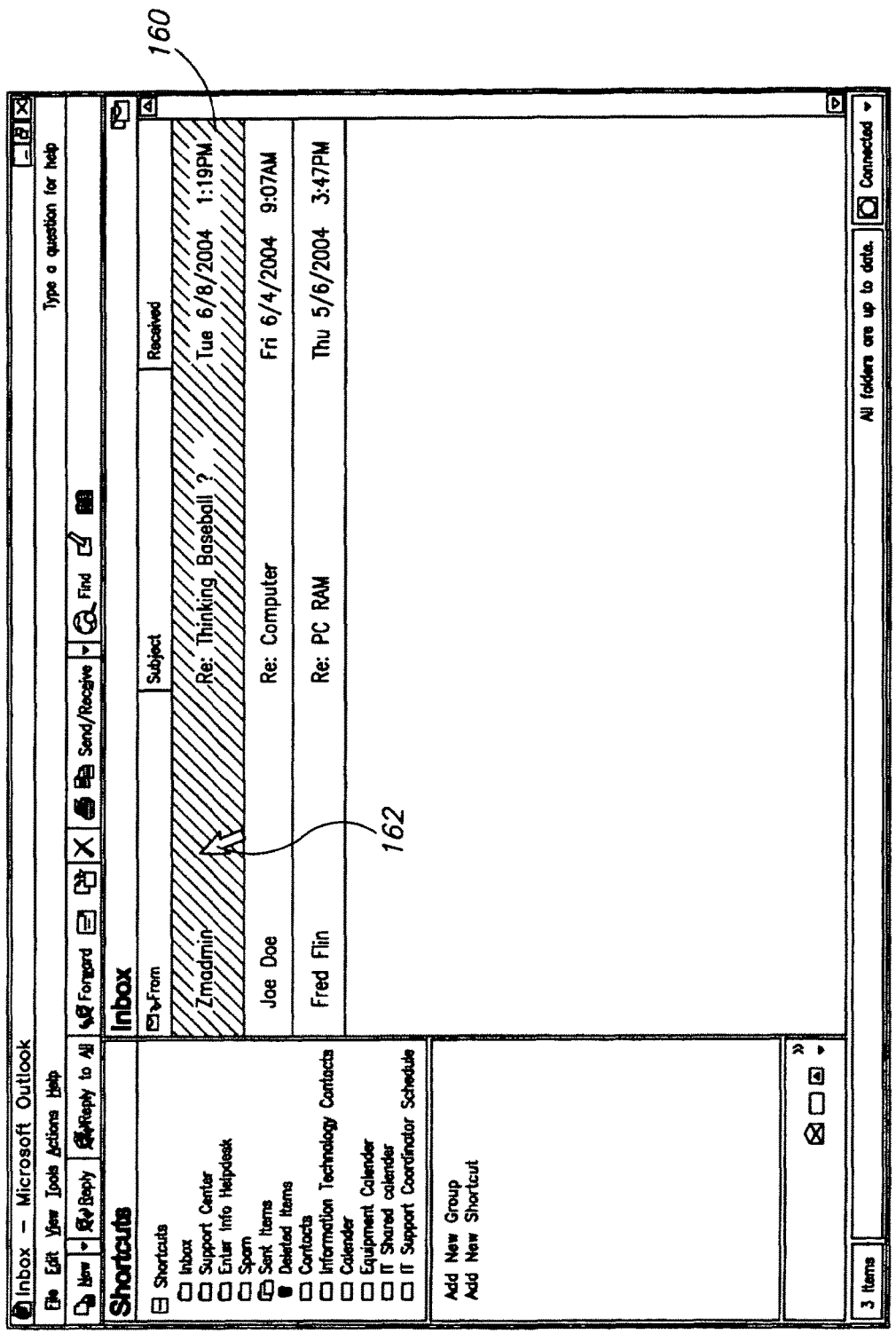
FIG. 3 is a screen shot showing e-mail communications in the mailbox of a recipient.

When an e-mail is sent, it appears in the mailbox of a user, for example, the user 40, whose e-mail address is user@xyz.com, as shown by the screen shot of FIG. 3. The particular e-mail is shown by the area 160 in the shaded lines (for emphasis only). It is opened by the user by clicking their pointing device 51 (FIG. 1A) on their monitor 48, as indicated by the arrow 162. The e-mail includes an identifier, that is sent back to the home server (HS) 30 in data created when the e-mail is opened.

For example, turning also to FIG. 1B, the identifier, that is sent back, is matched with the identifier in the database 43*a*, that pulls e-mail text from the database 43*b*, sends this text to the imaging server (IS) 38, and to the user's e-mail client. In accordance with this example, if identifier 1001 is sent back, there is a corresponding e-mail text identifier, i.e., ET001, that is also in the database 43*b*, such that corresponding text for baseball is pulled from the database 43*b* and sent to the imaging server (IS) 38. Throughout this process the e-mail for baseball carries the identifier 2001, as contained in the databases 43*a* and 43*c*.

Figure 4:
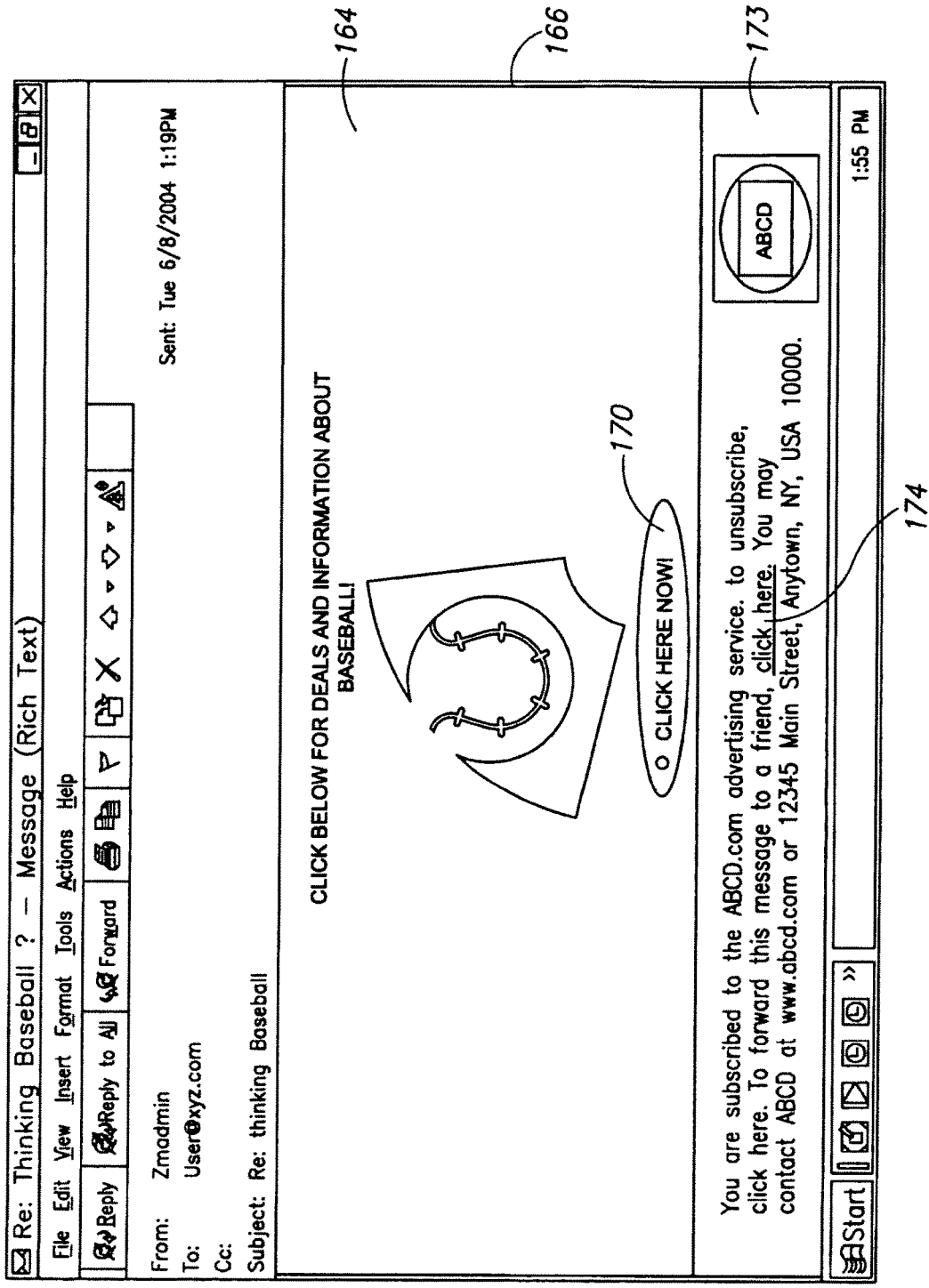
FIG. 4 is a screen shot of an exemplary graphic of the opened e-mail on the monitor of a user.

A graphic 164 appears on the monitor 48 of the user 40, the graphic 164 shown in the body 166 of the opened e-mail, in the screen shot of FIG. 4. Within this graphic 164 of the e-mail, there is an activatable location 170, that covers a link to a data object, typically a web page or landing page, detailed below, and is shown, for example, in FIGS. 7A and 7B. There is also an area 173, typically with a graphic as to a procedure for unsubscribing and an activatable portion 174, for example, the words "click here", that cover a link where the unsubscribe information is input.

Figure 5:
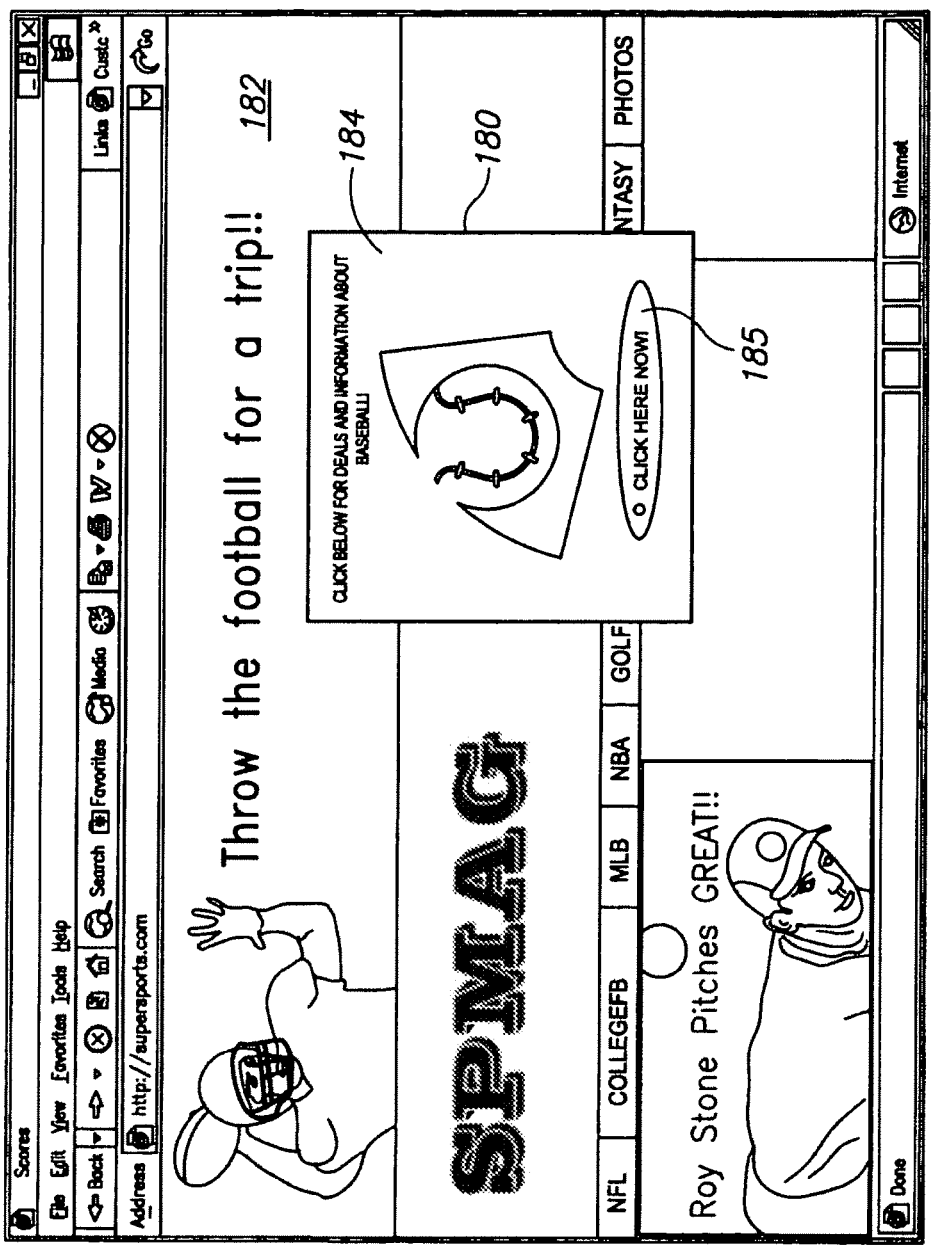
FIG. 5 is an illustration of an exemplary banner on the monitor of a user.

Alternately, with banners, as shown in FIG. 5, a banner 180 is sent to a web page 182, such that the banner 180 overlays the web page 182. For example, as shown in FIG. 1C, the banner sent includes an identifier, and a text identifier, from the database 43*a*', and text for the requisite banner, in the database 43*b*'. This text is sent to the imaging server (IS) 38, that sends the banner to the home server (HS) 30, for its being sent to the requisite web page being browsed by the requisite user. For example, in the case of a banner for baseball, the banner would carry the identifier 2001, as contained in the databases 43*a*' and 43*c*'. This identifier 2001 is associated with a banner text identifier, i.e., BT001 that will identify the requisite banner text in the database 43*b*' (this text is sent to the imaging server (IS) 38 and then back to the home server, for sending to the requisite web page). The banner 180 includes a graphic 184 with an activatable location 185, that covers a link, to a web page, or landing page, detailed below.

The decision to send a particular e-mail or banner to a particular recipient or web browser, may be random. Alternately, for example, the e-mail or banner sent may be decided in accordance with a behavioral analysis of the intended recipients, or a distribution optimization formula, as discussed above. The module 44*c* may also monitor the network 24 in performing its applications.

The process continues at block 104, where a response is received from the user. The response is, for example, initiated by a click on respective activatable location 170, 185. The click produces data, that is sent to the home server (HS) 30. The sent back data is input for the home server (HS) 30. The sent back data typically at least an identifier or unique identifier of the e-mail that is being responded to. For example, if the above discussed baseball e-mail or banner was sent, the sent back data would include the identifiers 1001 and 2001, respectively of databases 43c and 43c' respectively, that are associated with the keyword "Baseball" in these databases. The sent back data may also include one or more keywords, requests, and other data necessary to generate the requisite landing pages (detailed below).

With the input received in the home server (HS) 30, the process moves to block 106, where a landing page 191 is created.

The landing page is typically created dynamically, in that its content, typically listings and their corresponding underlying links, are obtained contemporaneous, and typically, immediately after, receipt of the input at the home server (HS) 30, as the keyword or other identifier is sent to the content server(s) (CS) 34a-34n to obtain listings and the corresponding underlying links. For example, the process of dynamically obtaining the listings may be in accordance with the processes detailed in commonly owned U.S. patent application Ser. No. 10/915,975, entitled: Method and System for Dynamically Generating Electronic Communications (U.S. Patent Application Publication No. 2005/0038861), the disclosures of which are incorporated by reference herein. Accordingly, the user, whose input is received at a first time, typically receives a different landing page than a user whose input is received at a second time, after the first time. This is because the order of listings and their underlying links on the respective content servers (CS) 34a-34n is constantly changing. Caching, an alternate embodiment detailed below, may result in multiple users, receiving the same landing page, but even cached listings may be reordered upon the creation of the landing page.

Figure 6:
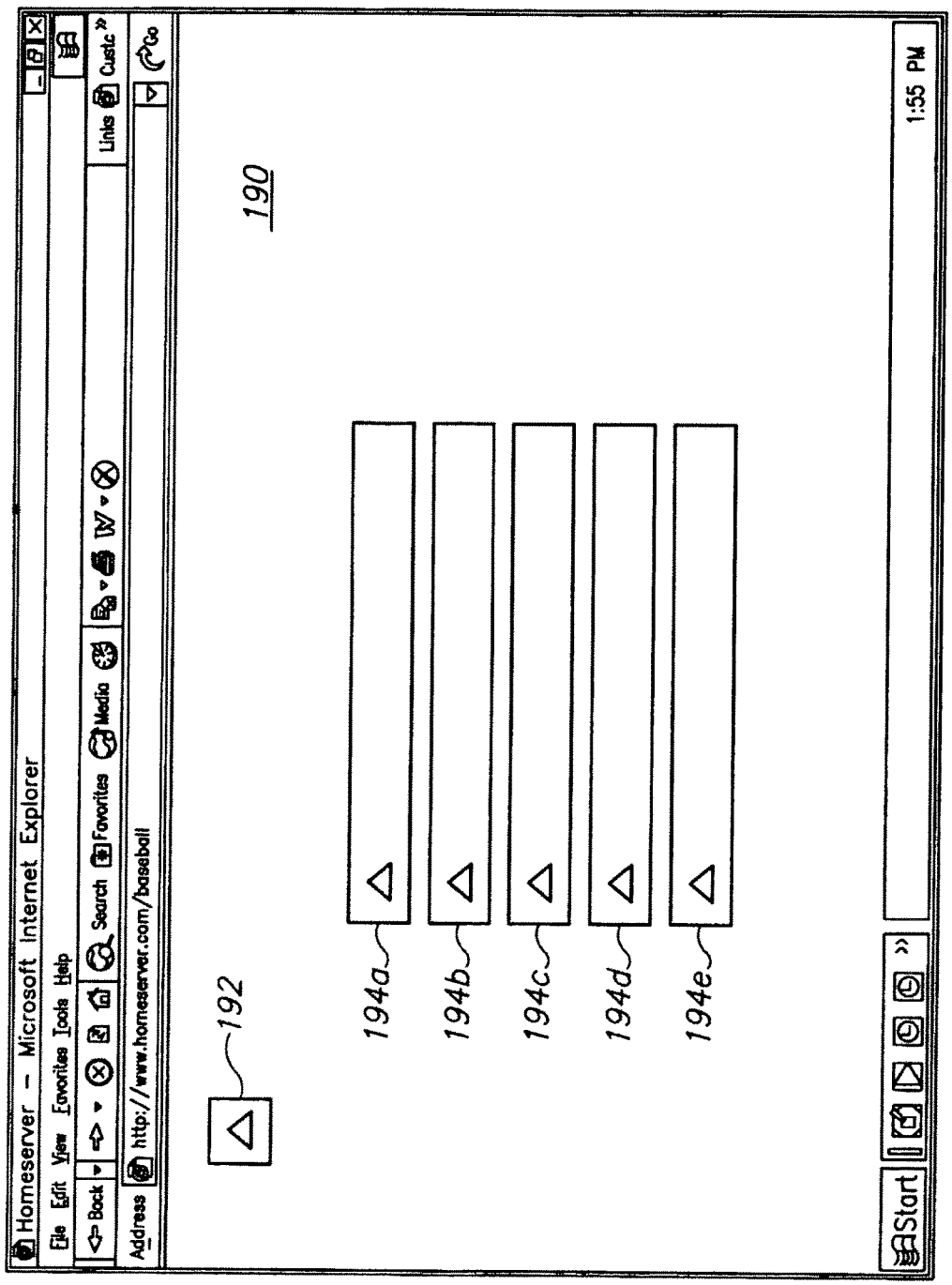
FIG. 6 is a screen shot of an exemplary template in accordance with an embodiment of the invention.

The landing page may initially appear in the form of a template 190, with a space for a main image 192 and spaces for listings 194a-194e, as shown in FIG. 6. For example, turning to FIGS. 1B and 1C, the identifiers (1001 and 2001 both associated with the keyword "baseball" in the databases 43c and 43c' respectively) are associated with a landing page template identifier, e.g., EL001 for identifier 1001 and BL001 for identifier 2001, respectively, in the respective databases 43c, 43c', that is used to access the respective template, from the respective database 43d, 43d'.

Figure 7A:
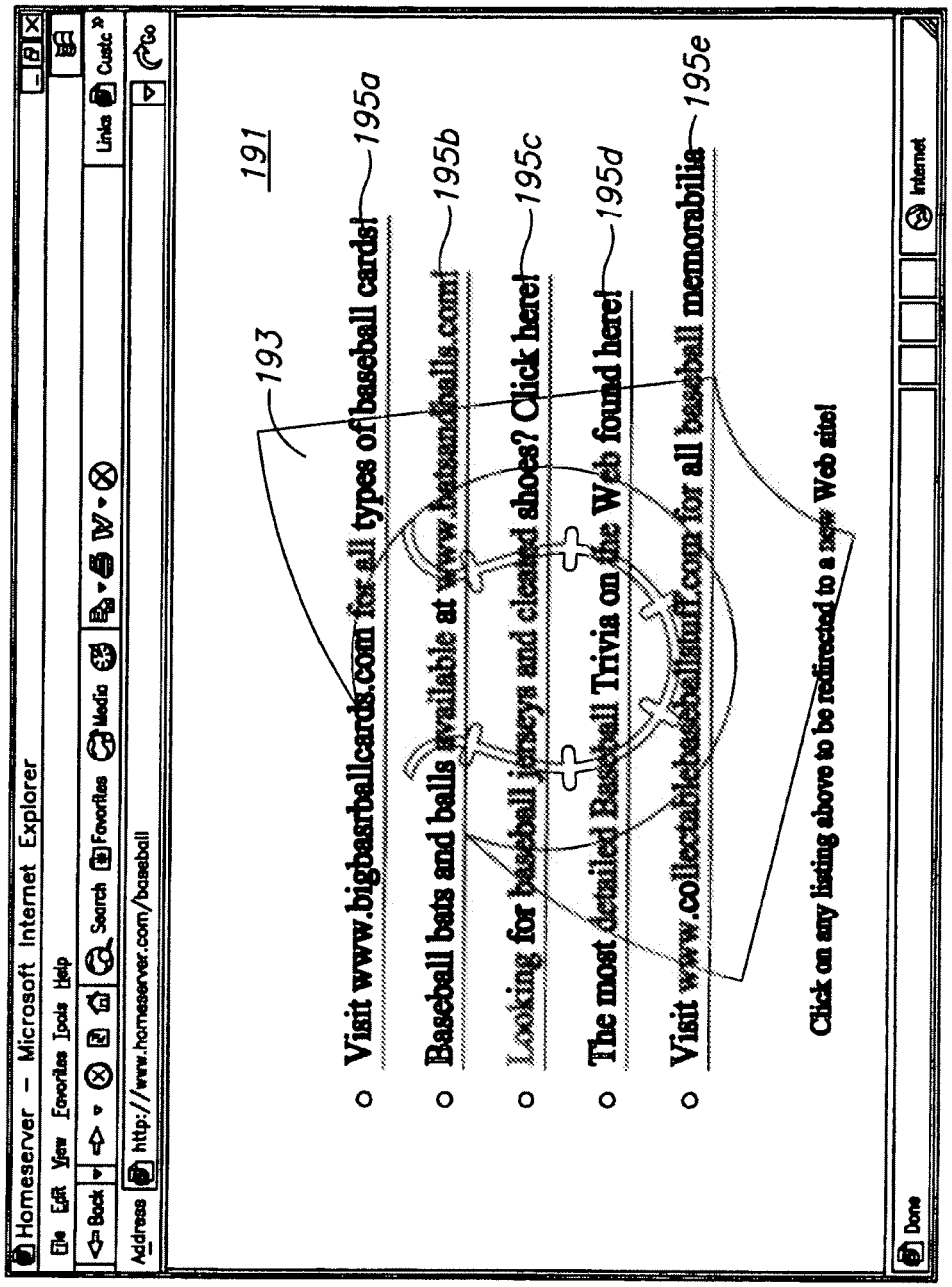
FIG. 7A is a screen shot of a landing page resulting from activating the link on the e-mail or banner.

The template 190 is filled, as detailed below and shown in FIG. 2B, as pulled text (from the requisite content server(s) (CS) 34a-34n) is converted to images in the imaging server (IS) 38 and sent to the home server (HS) 30 for placement into the template 190, and the landing page 191 is completed or built out. The build out includes rendering text as images, through the imaging server (IS) 38, into the template 190. The rendered images result in the landing page 191, for example, as shown in FIG. 7A, the landing page 191 having a main image 193 with listings 195a-195e over links to data objects, for example, targeted web pages. The landing pages are typically web pages.

Figure 7B:
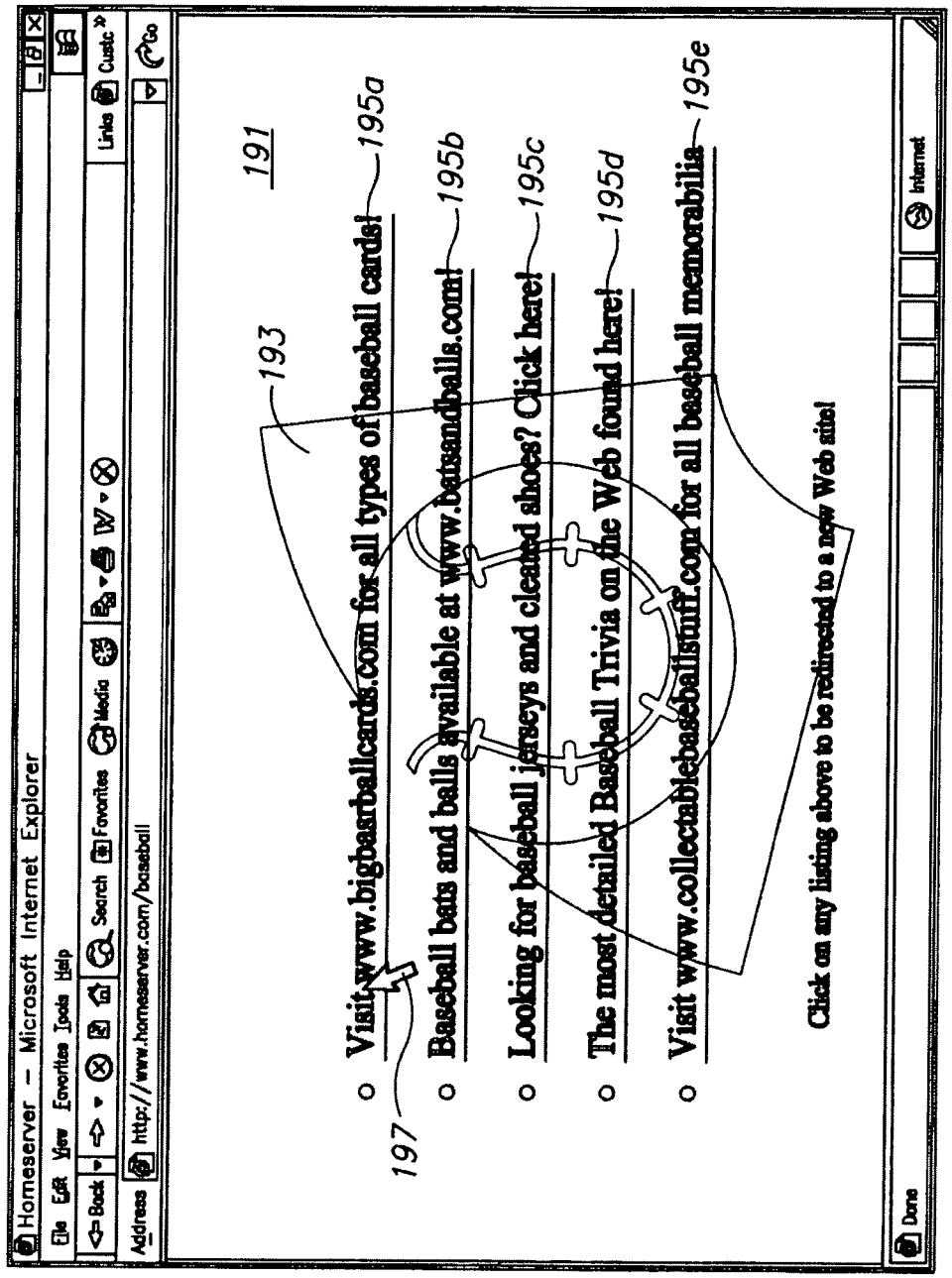
FIG. 7B is a screen shot of the landing page with a listing being activated by the user.

Once the landing page is created, the browser of the user is directed to a data object, typically the now created landing page, at block 108. Turning also to FIG. 7B, when the respective listing 195a-195e is activated or "clicked" (as shown by the arrow 197), the corresponding link is activated, and the browser of the user is directed to the targeted web site, associated with the listing and link.

For example, in the case of the keyword "baseball", the browser of the user would be directed to the URL www.homeserver.com/baseball, in order to access the landing page for the keyword baseball, such as that shown in the screen shot of FIG. 7A. This screen shot appears on the monitor 48 of the user 40.

The user 40 may then activate one of the links, by directing their pointing device 51 to one of the listings 195a-195e, that covers the requisite link, as indicated by the arrow 197 at FIG. 7B. For example, the user 40 seeks the listing for "baseball cards." Upon clicking on the listing 195a, the underlying link is activated, this activation creating electronic data that is input, and is received in the home server (HS) 30. With the input received, the browser of the user (browsing application) is redirected to a second data object, typically, a targeted web site associated with the listing and underlying link, at block 110.

Figure 8:
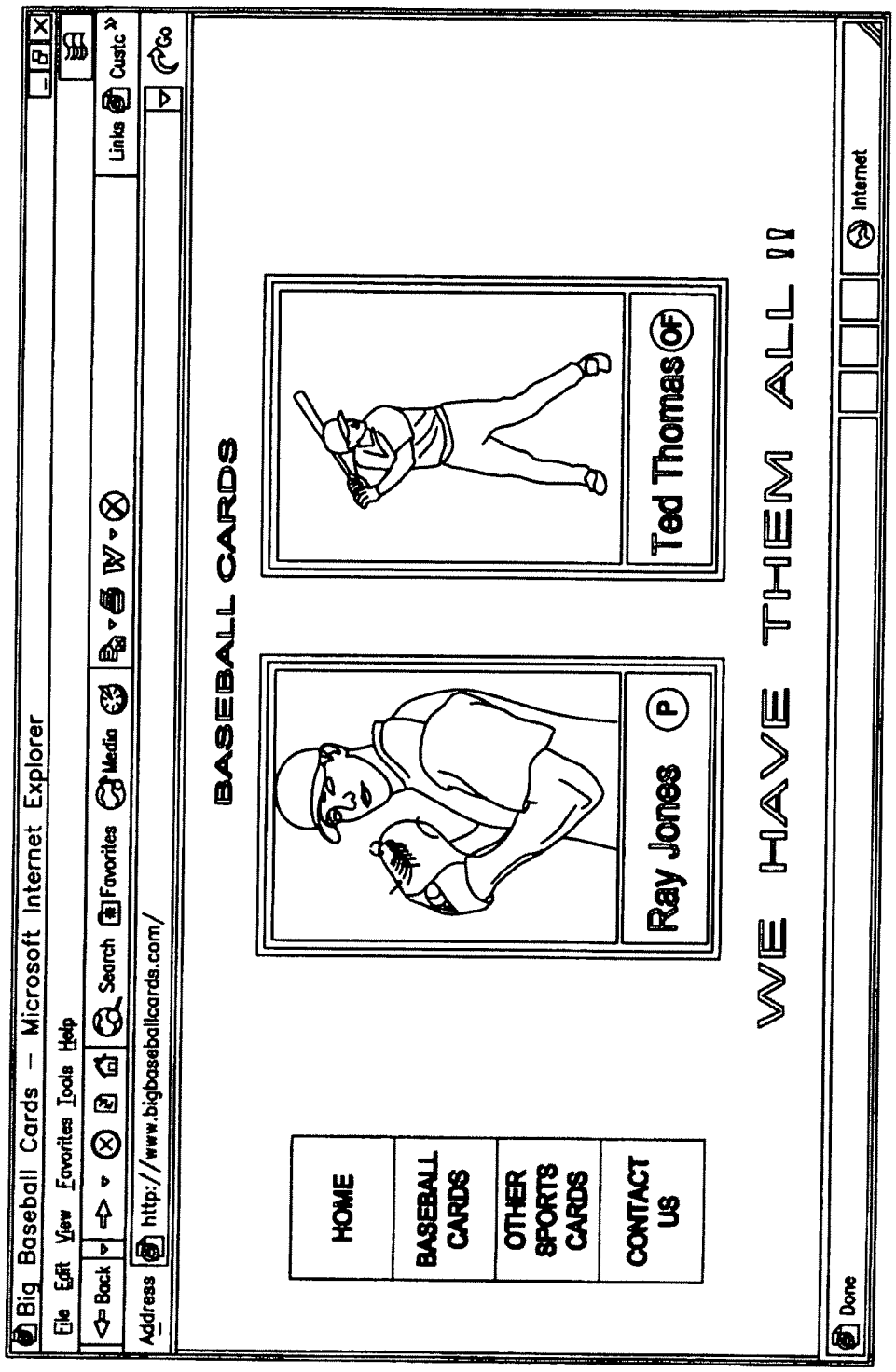
FIG. 8 is a screen shot showing a web page accessed from a redirect uniform resource locator on the landing web page in accordance with an embodiment of the invention.

The target web site may be hosted by one of the third party servers (TPS) 42a-42n. For example, with the listing 195a clicked, the link is activated, such that the browser (browsing application) of the user is directed to the targeted web site, for example, the web site with the URL www.bigbaseballcards.com. This results in the screen shot of FIG. 8, appearing on the monitor 48 of the user 40. The results of each click, and ultimate "click through" for the e-mail and banners, may be stored, for example, in the databases 43e, 43e', respectively. Moreover, with the link activated by the click on the listing 195a, the browser (browsing application) of the user is now outside the system or network, that delivered the electronic communication and landing page.

Returning to block 106, and turning to FIG. 2B, FIG. 1B, and FIG. 1C, the process for preparing the landing page (for example, the landing page 191 of FIG. 7A) is now detailed. Initially, in the response to the activated e-mail or banner 184 (the "click" at locations 170 and 185 respectively, thereon by the user), as detailed above, an identifier or unique identifier, indicative of the particular e-mail sent to the user or banner, is sent back to the home server (HS) 30. The identifier or unique identifier, that is sent back to the home server (HS) 30 by the user "clicking on" the e-mail or the banner, is matched with the corresponding identifier in respective databases 43c, 43c'. This identifier in the database is matched with one or more keywords, and an identifier (ID) for text for a particular template, that supports graphics, that are rendered by the imaging server (IS) 38. Once the keyword(s) is found in the database, the template for the keyword(s) is activated, at block 106b.

The keyword(s) is then submitted to a content server (CS) 34a-34n, also functioning as a keyword server, for example, a server that operates a search engine or other data pulling application, at block 106c. For example, with e-mail, should identifier 1001 have been returned, the corresponding word "baseball" from database 43c is the keyword that is provided to the requisite content server(s) (CS) 34a-34n. Similarly, for example, with banners, should identifier 2001 have been returned, the corresponding word "baseball" from database 43c' is the keyword that is provided to the requisite content server(s) (CS) 34a-34n.

The search engine or data pulling application, obtains listings with links corresponding to the keyword(s), at block 106d. The links are typically to data objects, for example, targeted web sites (or targeted web pages). Based on the rules of the requisite template, the requisite listings, with their corresponding links to data objects, are imported into the requisite template at the requisite locations, at block 106e. One or more listings with links may be imported into the template from one or more content servers (CS) 34a-34n, search engines and the like. The imported listings with links are placed into locations 192a-192e in the template 190, in any desired order, at block 106e. For example, with the keyword "baseball", listings with links are placed at locations 192a-192e in the template 190 of FIG. 6. The order of the listings may be, for example, in accordance with pay per click (PPC) values (stored for example, in the requisite databases 43f, 43f).

Figure 2C:
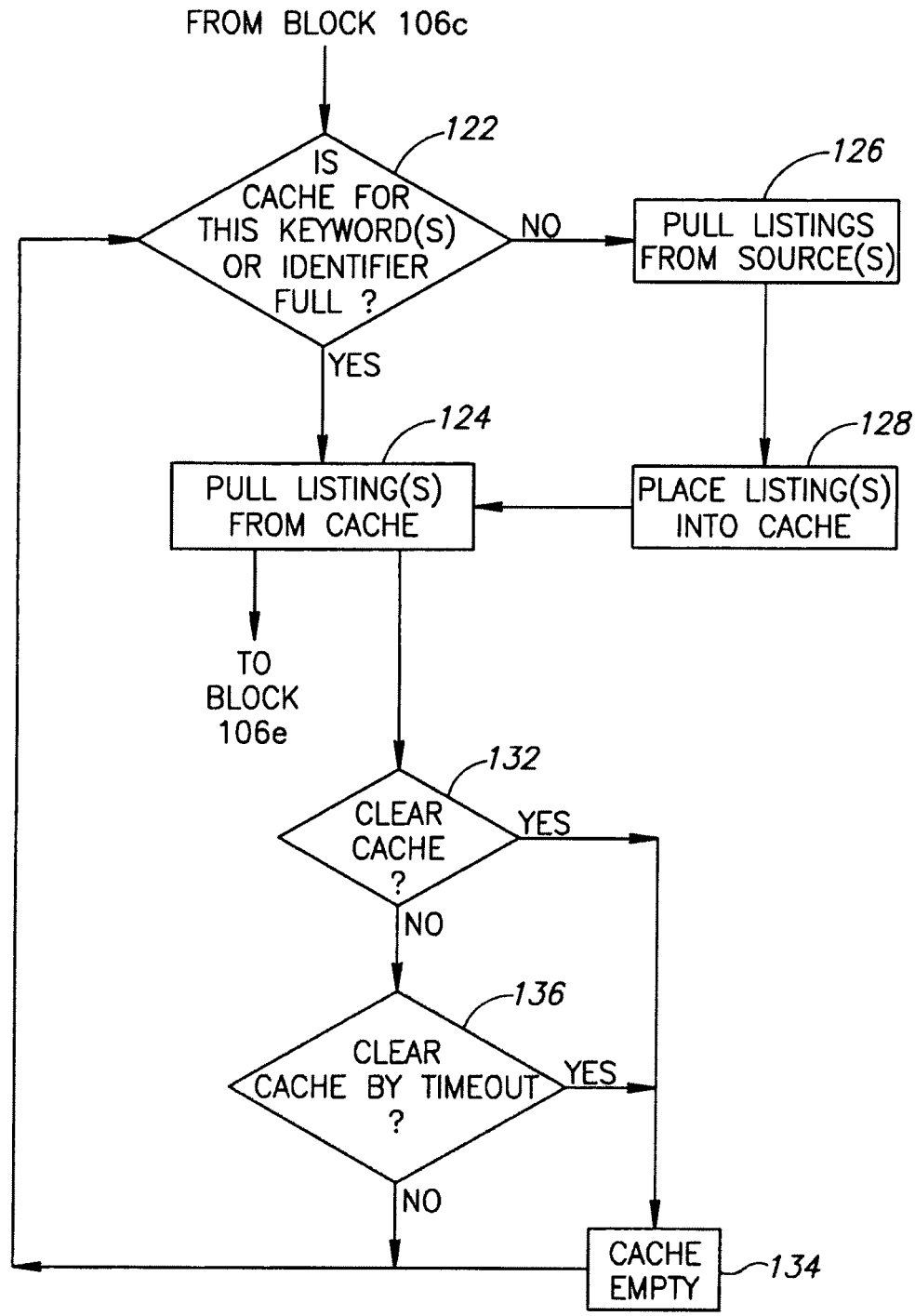
FIG. 2C is a flow diagram of an alternate sub process for obtaining one or more listings for creating the landing page of FIG. 2B.

Alternately, turning to FIG. 2C, there is detailed an alternate sub process of obtaining listings, as per block 106d of FIG. 2B. The sub process may be performed by sub processes including caching the listings, along with their links, for example, in the listing caches 43g, 43g' (FIGS. 1B and 1C). This way, at a subsequent time, when listings for the same keyword(s) are sought, the listings are taken from a cache, as opposed to going to outside sources on the network, for example the content servers (CS) 34a-34n, search engines, etc. The process for creating the landing page is similar to that of FIG. 2B above, except as to the method for obtaining the listing(s) for the keyword(s).

Initially, starting from block 106c, the identifier, keyword, or both is checked in the databases and caches 43a-43n, to see if there is a cache that includes listings, stored for the requisite identifier and/or keyword, at block 122. If there are listings in the cache for this keyword and/or identifier, the requisite number of listings, in accordance with any desired order or rank, are pulled for a corresponding number of positions in the template (for example, positions 194a-194e in FIG. 6), at block 124.

Alternately, if the requisite cache is empty at block 122, the listings and their links are pulled from sources, at block 126. The pulling of listings from sources at block 126 is in accordance with the sub process detailed in block 106d above. The listings pulled from the sources at block 126 are then cached (placed into a cache for the particular keyword (s) or identifier(s)) at block 126, and the process moves to block 124, where the requisite number of listings, in accordance with any desired order or rank, are pulled for a corresponding number of positions (for example, positions 194a-194e in FIG. 6) in the template.

For example, in the case of both e-mail and banners, the respective listing caches 43g, 43g' may be full of listings (Listing 1 to Listing n) for the respective identifiers 1001 and 2001 and the corresponding keyword "baseball", from a previous data pull (detailed above). (Additional listing caches are part of the homer server (HS) 30, but are not shown as they are similar to the listing caches 43g, 43g', for each identifier/keyword combination). In this case, upon return of the identifier in the sent-back data from the specific e-mail or banner (being "clicked"), the identifier is matched, whereby the landing page template IDs, i.e., EL001 and BL001, will be used to obtain the corresponding landing page template in the respective databases 43d, 43d'. The number of listings supported by the template will be taken from the cached listings (Listing 1 to Listing n), to fill out the corresponding positions in the template with listings and an underlying link to a targeted web site associated with each listing.

From block 124, the process moves to block 106e of FIG. 2B. The process continues as detailed above.

Once the pull of the requisite number of listings, corresponding to the number of positions for listings in template, has been made, or contemporaneous or simultaneous with the pull, the requisite cache may be cleared, at block 132. This clearing is typically by a rule. If the cache is cleared, the cache will be empty, at block 134. This empty status for the requisite cache will be the status of the cache at block 122, for the next occurrence of the keyword(s) or identifier. The cache may remain full until potentially cleared by a timeout, or other rule, at block 136. If the cache is cleared by the timeout, the process moves to block 134, as detailed above. Otherwise, the cache remains full, as there has not been a timeout. The full status for the requisite cache will be the status of the cache at block 122, for the next occurrence of the keyword(s) or identifier.

Figure 9A:
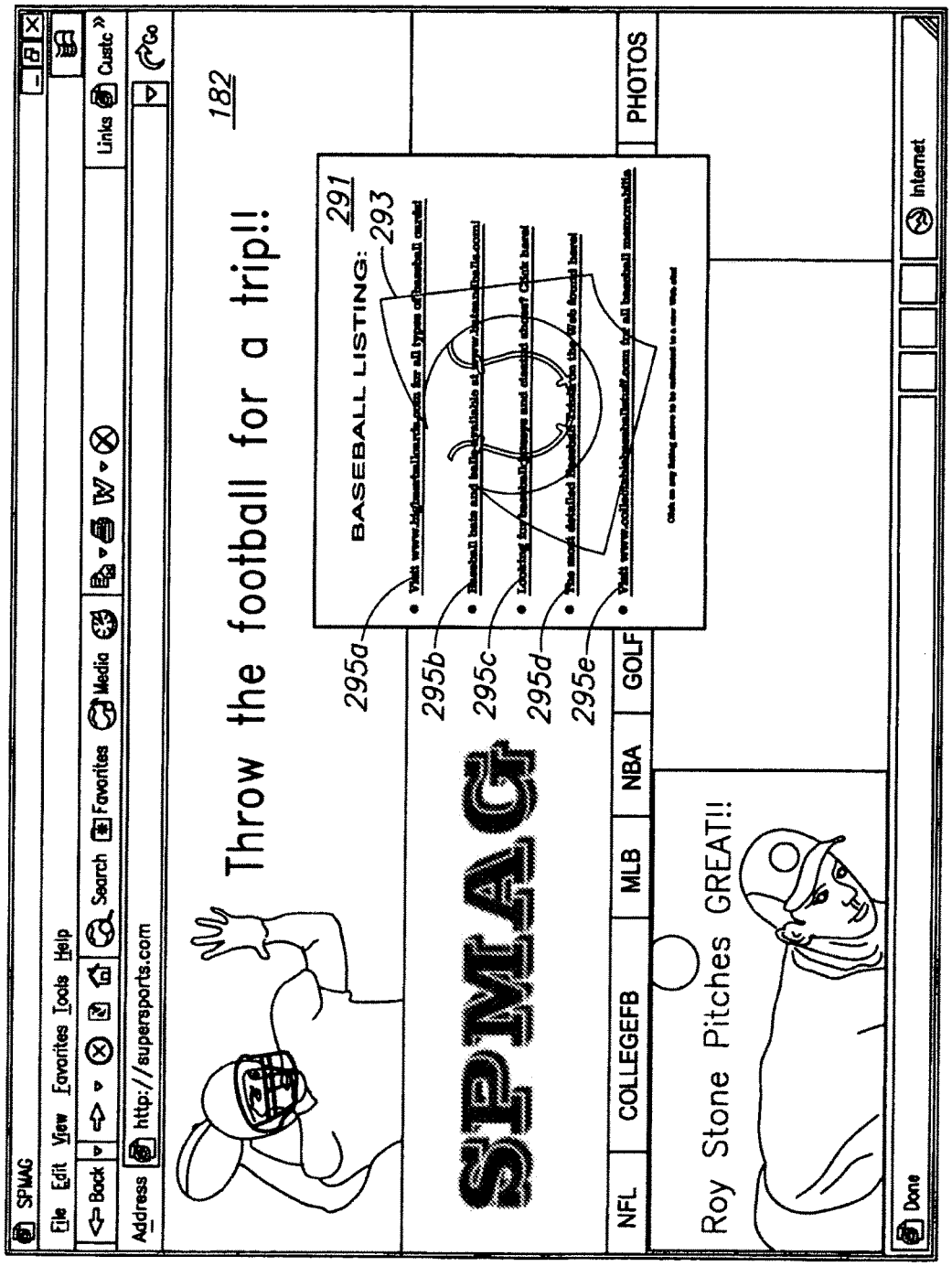
FIG. 9A is a screen shot of an alternate landing page resulting from activating the link on the banner.
Figure 9B:
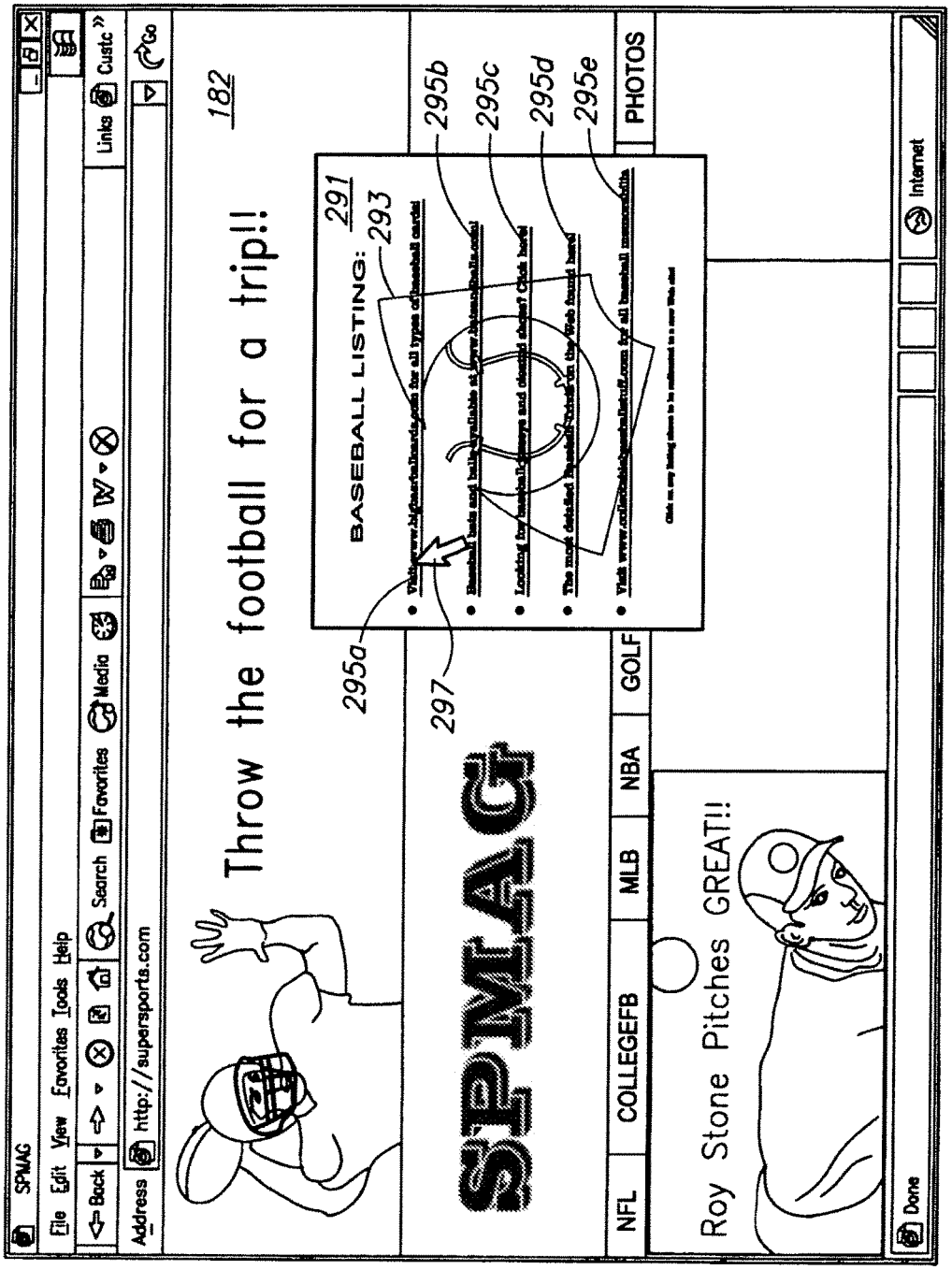
FIG. 9B is a screen shot of the alternate landing page with a listing being activated by the user.

Attention is now directed to FIGS. 9A and 9B, that show an alternate method for the banner 180 of FIG. 5. When the banner 180 is "clicked on" at the location 185 over the link, the landing page 291 is created, in accordance with any of the processes and sub processes detailed above and shown in FIGS. 2A-2C. Components of the landing page 291, similar to those of the landing page of FIG. 7A are labeled similarly, with numbering in the corresponding 290's. The landing page 291 is positioned in the banner 180.

Turning to FIG. 9B and similar to the landing page 191 of FIG. 7B above, the user may "click" on the desired listing. For example, as indicated by the arrow 297 on the listing 295a, the "click" on this particular listing 295a, will redirect the browser of the user 40 to the targeted data object, typically, the targeted web site, for example, the web site of FIG. 8, as detailed above.

Figure 10A:
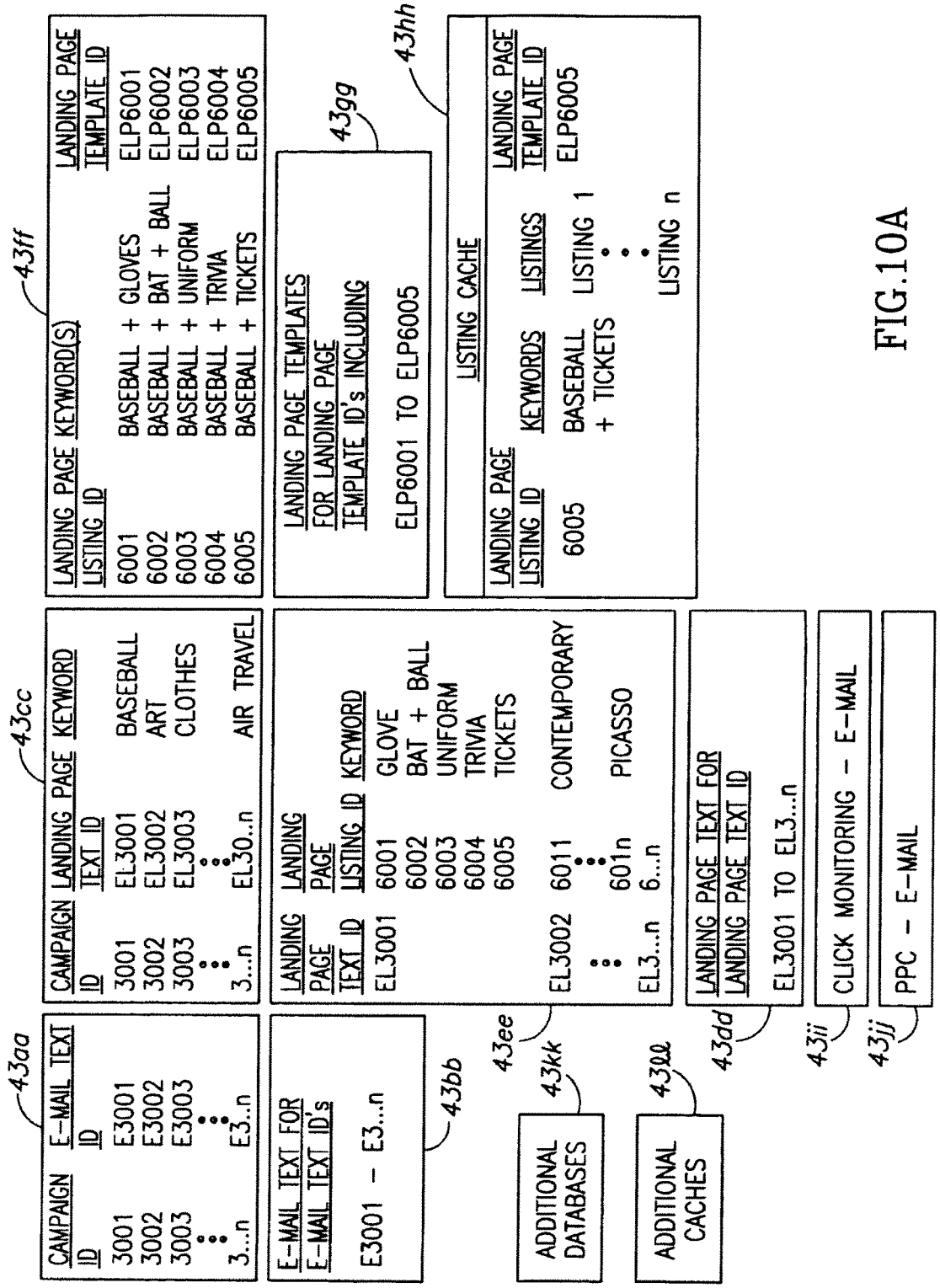
FIGS. 10A and 10B are diagrams of exemplary databases for a second embodiment of the invention detailing an alternate arrangement of the databases of FIG. 1A.

FIGS. 10A-14 show an alternate method and system for creating multiple landing pages or data objects, prior to the browser redirect to the target data object or web site. FIGS. 10A and 10B show alternate databases and caches for the databases and caches 43a-43n of the system of FIG. 1A and detailed above. The system and method in FIGS. 10A-14 is operable with both e-mail and banners, in accordance with the embodiments detailed above, and the processes detailed above and shown in the flow diagram of FIG. 11.

Figure 11:
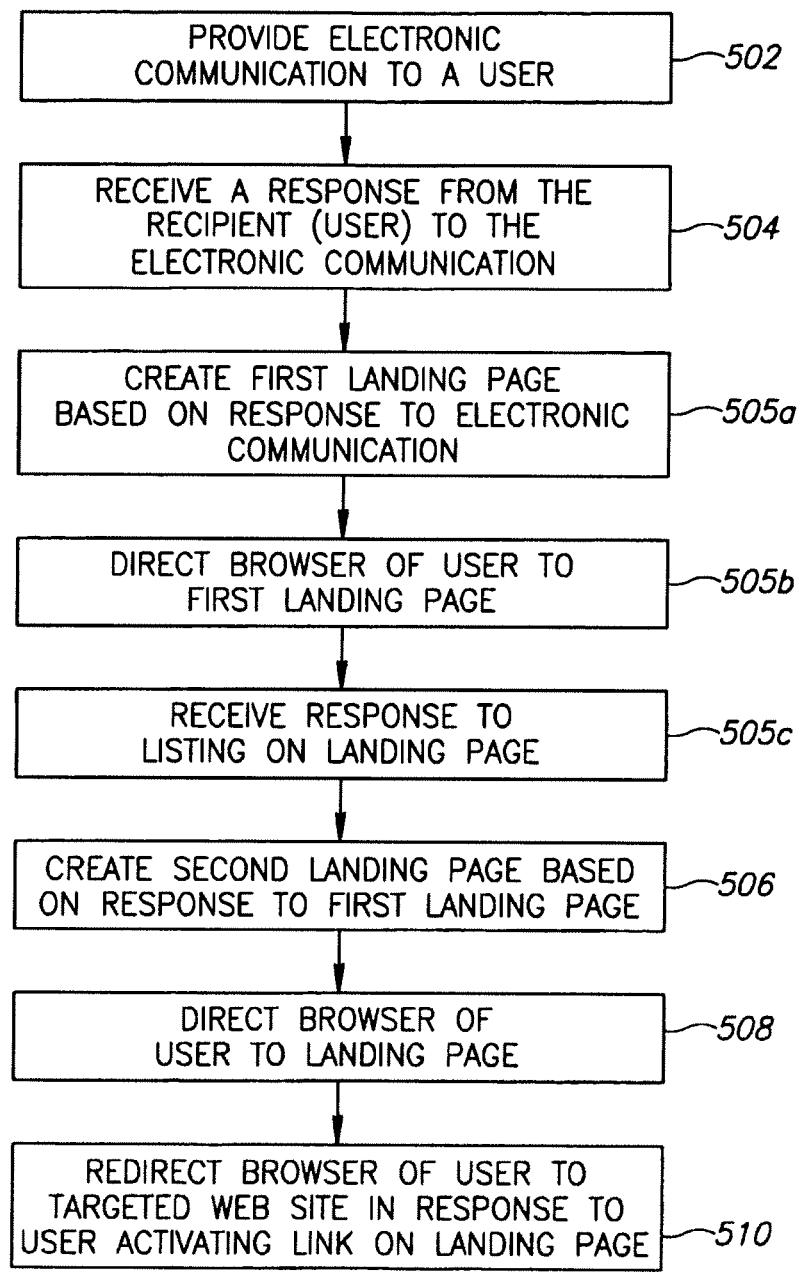
FIG. 11 is a flow diagram detailing a process in accordance with the second embodiment of the invention.

Following the flow diagram of FIG. 11, at block 502, the electronic communication is provided to the user, typically as either an e-mail or banner, as detailed above in block 102. A response is then received from the user, typically data including a campaign identifier, as the user "clicks" on the requisite portions of the opened e-mail 170 of FIG. 4, or 185 of FIG. 5, at block 504 (similar to block 104 detailed above).

For example, each e-mail and banner includes a campaign identifier correlated to a text identifier in databases 43aa and 43aa', respectively. This text identifier is used for accessing the text of the requisite e-mail or banner from the respective database 43bb, 43bb'.

A first landing page is then created, based on the data sent to the home server (HS) 30 in response to the user's "click" on the open e-mail or banner, at block 505a. For example, the user's "click" causes data with a campaign identifier, associated with the e-mail or banner received by the user, to be sent to the home server (HS) 30. The campaign identifier is matched with the corresponding campaign identifier in the database 43cc and 43cc'. The campaign identifier is associated with a keyword, and a landing page text identifier. The landing page text identifier will be used to obtain text for the corresponding landing page, the text stored in the databases 43dd, 43dd' respectively.

The text is typically for a main image (when processed through the imaging server (IS) 38) and one or more images (when processed through the imaging server (IS) 38) for listings covering links. The links are typically to the home server (HS) 30 and each link includes an identifier for another or subsequent landing page. The user's browser is directed to this first landing page, at block 505b, for example, the landing page 531 shown in FIG. 12A. The landing page 531 includes a major image 533 and listings 535a-535e, that cover the aforementioned activatable links (to the homer server (HS) 30), to a subsequent landing page.

Figure 10B:
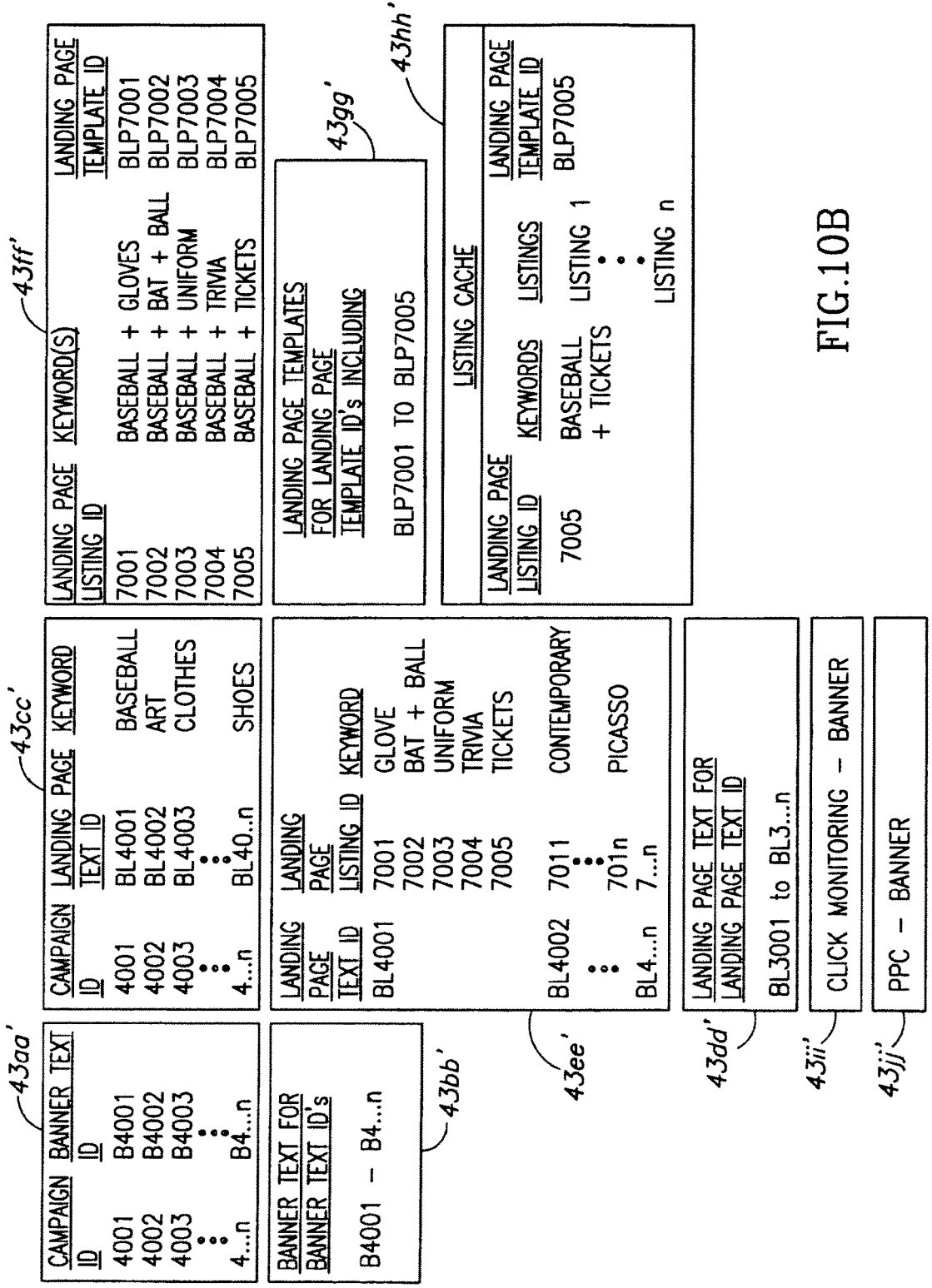

For example, turning to FIGS. 10A and 10B, should the campaign be for "baseball," the campaign identifier for this campaign is 3001 for e-mail and 4001 for banners. Upon opening the e-mail or banner, the data sent back from the opened e-mail or banner includes the campaign identifier 3001 or 4001. This campaign identifier is matched with the campaign identifier in the respective database 43cc, 43cc', i.e., 3001 for e-mail and 4001 for banners. The campaign identifiers are correlated with the keyword "Baseball" and a landing page text identifier (ID), i.e., EL3001 for e-mail and BL4001 for banners. The text for the corresponding landing page is then obtained from the respective databases 43dd, 43dd'. When the requisite landing page has been obtained and the user's browser is directed to this landing page, the listings in the landing page each have landing page listing identifiers (ID), i.e., 6001-6005 for the landing page EL3001, for e-mail, and 7001-7005 for the landing page BL4001, for banners.

Figure 12A:
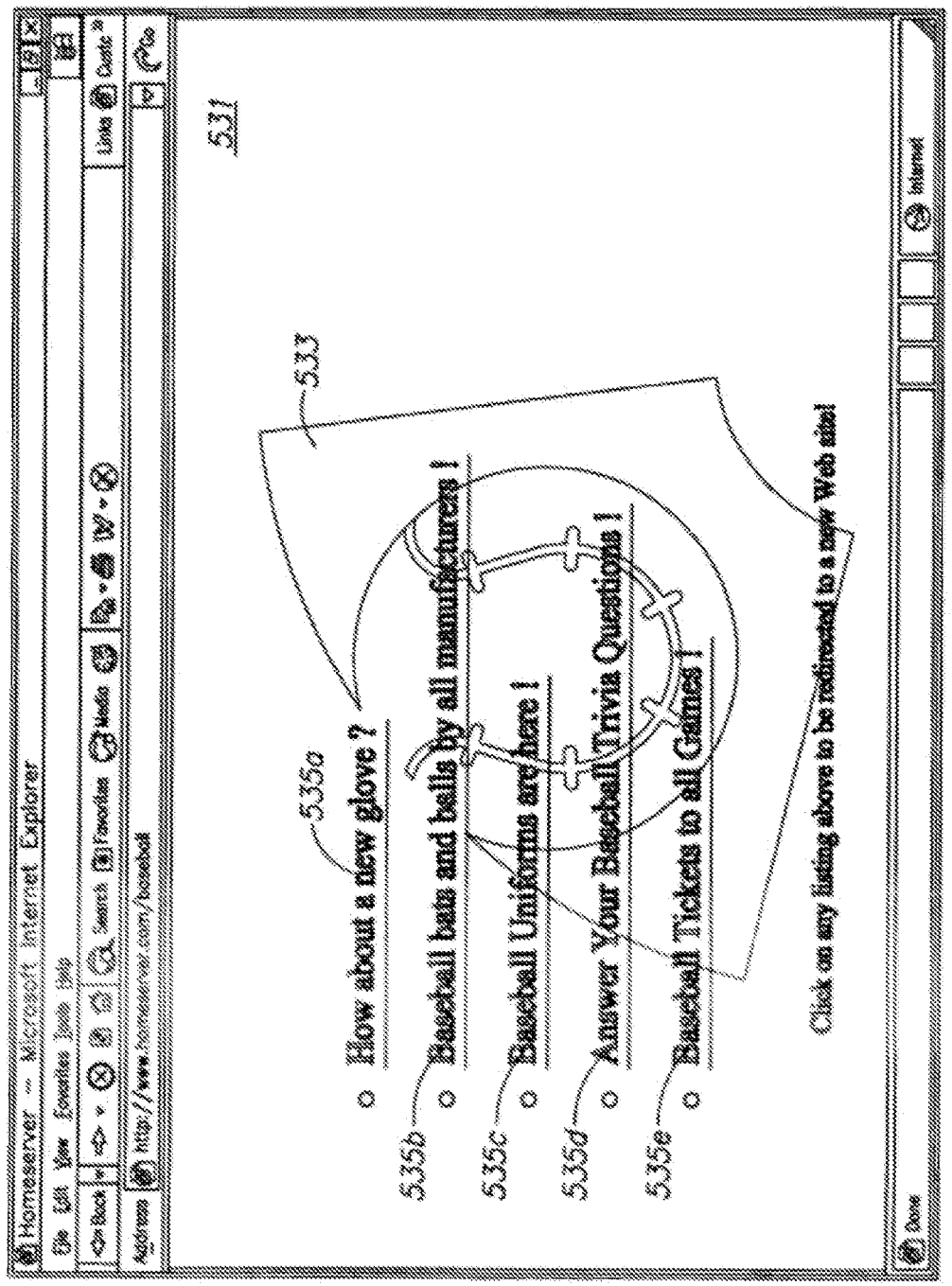
FIG. 12A is a screen shot of a first landing page in accordance with the second embodiment of the invention.
Figure 12B:
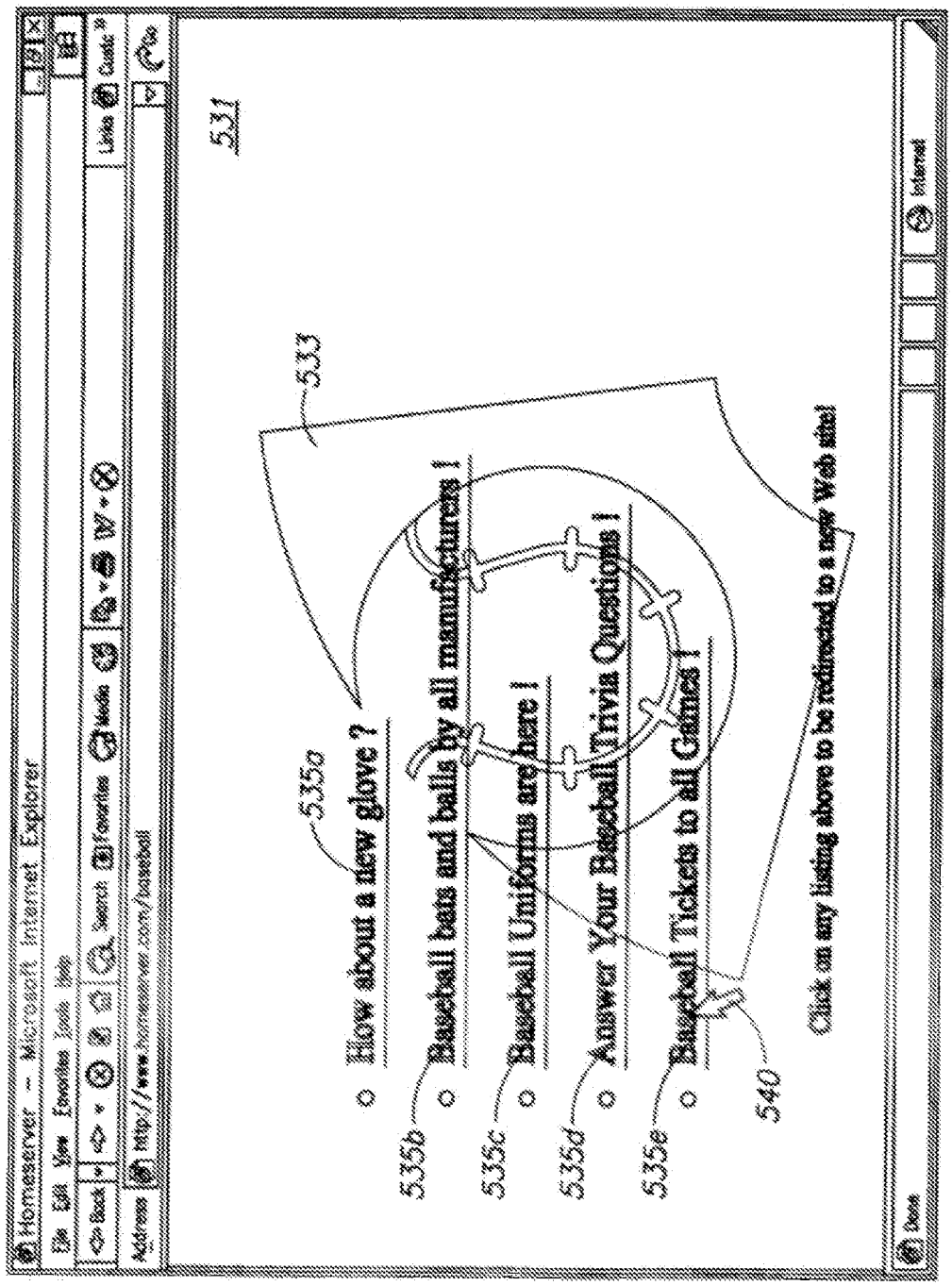
FIG. 12B is a screen shot of the first landing page with one of its listings being activated.

For example, the user then "clicks" on one of the listings, the "click" shown by the arrow 540, on the listing 535e, of the landing page 531, as shown in FIG. 12B. As a result of the "click", data, including at least an identifier, is sent back to the home server (HS) 30. Once this data is received, a second landing page is created at block 506. Creation of this second landing page is similar to that for block 106 of FIGS. 2A-2C detailed above, except two or more separate keywords (illustrated as separate by their separation with the plus sign "+") are sent to the keyword server(s) (content server(s) (CS) 34a-34n), caches or the like, to pull listings with underlying links.

Figure 13A:
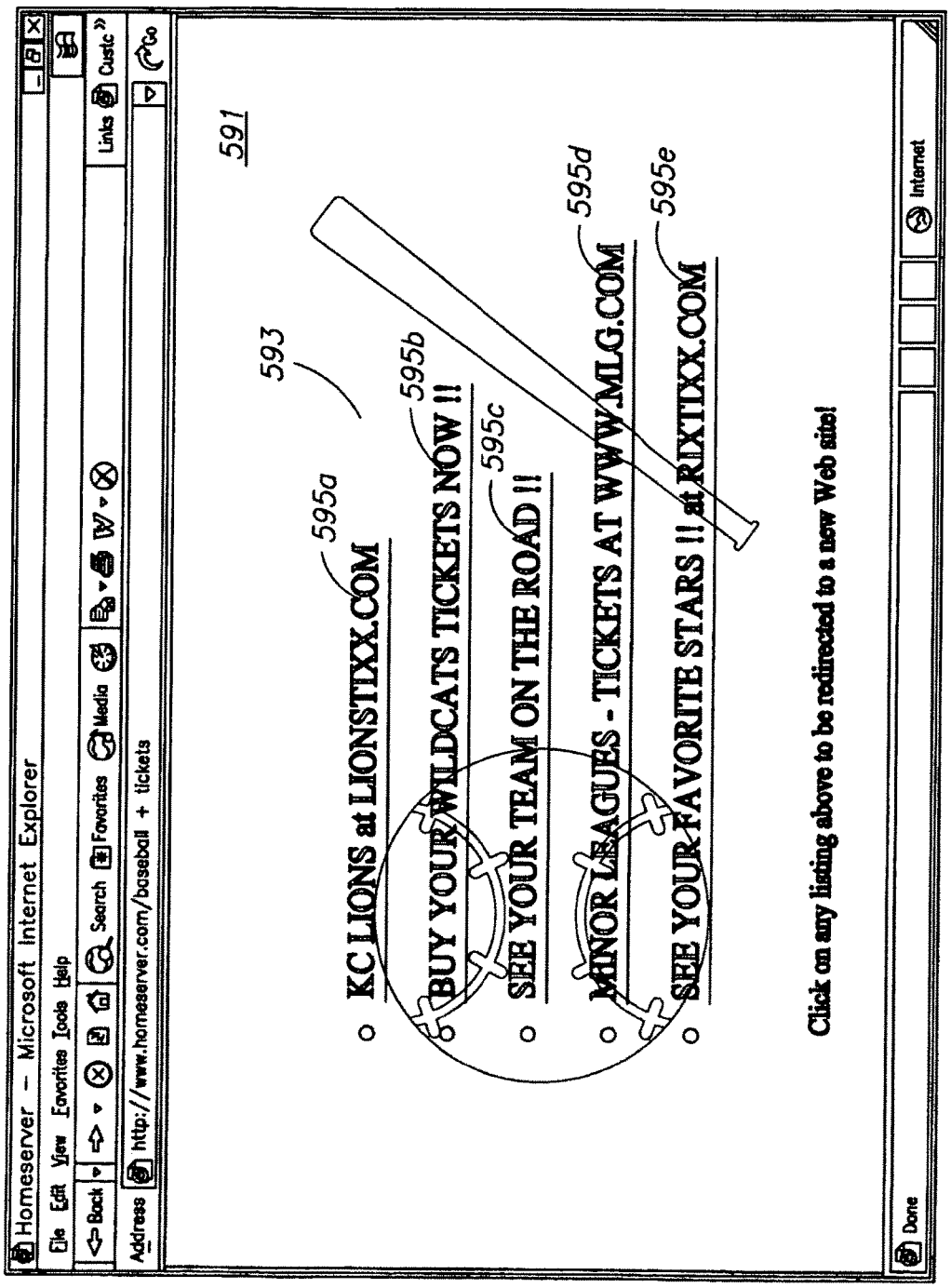
FIG. 13A is a screen shot of a second landing page in accordance with the second embodiment of the invention.

The second or subsequent landing page 591 is shown in FIG. 13A, to which attention is now directed. This landing page 591 is similar to the landing page of FIG. 7A, with corresponding elements numbered in the 590's. The landing page 591 includes a major image 593 and listings 595a-595e, that cover links, that when activated will ultimately direct the browser or browsing application of or associated with a user to a targeted web site, for example, hosted by one of the third party servers (TPS) 42a-42n (FIG. 1A).

For example, turning to FIGS. 10A and 10B, the "click" on the listing 595e sends data including landing page identifiers 6005 if from e-mail and 7005 if from banners, to the respective databases 43ff, 43ff'. The corresponding template identifier ELP6005 for e-mail, and BLP7005 for banners, is used to obtain the requisite template from the respective databases 43gg, 43gg', and the corresponding keywords "baseball" and "tickets" (expressed as "baseball+ tickets"), are sent to one or more content servers (CS) 34a-34n, functioning as keyword servers. Caches 43hh for e-mail, and 43hh' for banners, function in conjunction with databases 43gg and 43gg', respectively, if listings are obtained from caching as detailed above. (Listing caches for all other landing page listings are not shown, as they may be created similar to that for listing IDs 6001 and 7001).

Figure 13B:
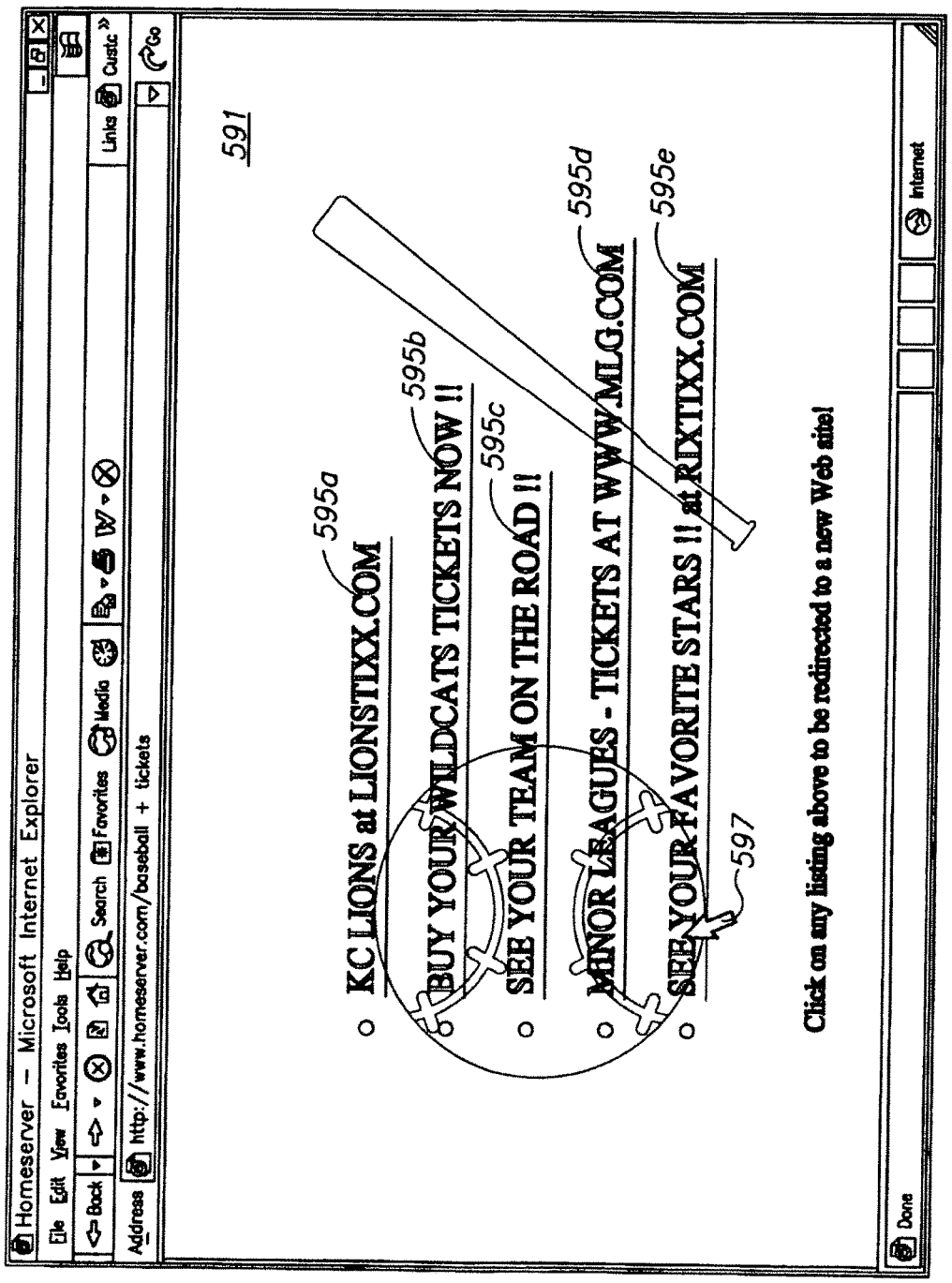
FIG. 13B is a screen shot of the second landing page with one of its listings being activated; and, FIG. 14 is a screen shot showing a web page accessed from a redirect uniform resource locator on the landing web page in accordance with the second embodiment of the invention.
Figure 14:
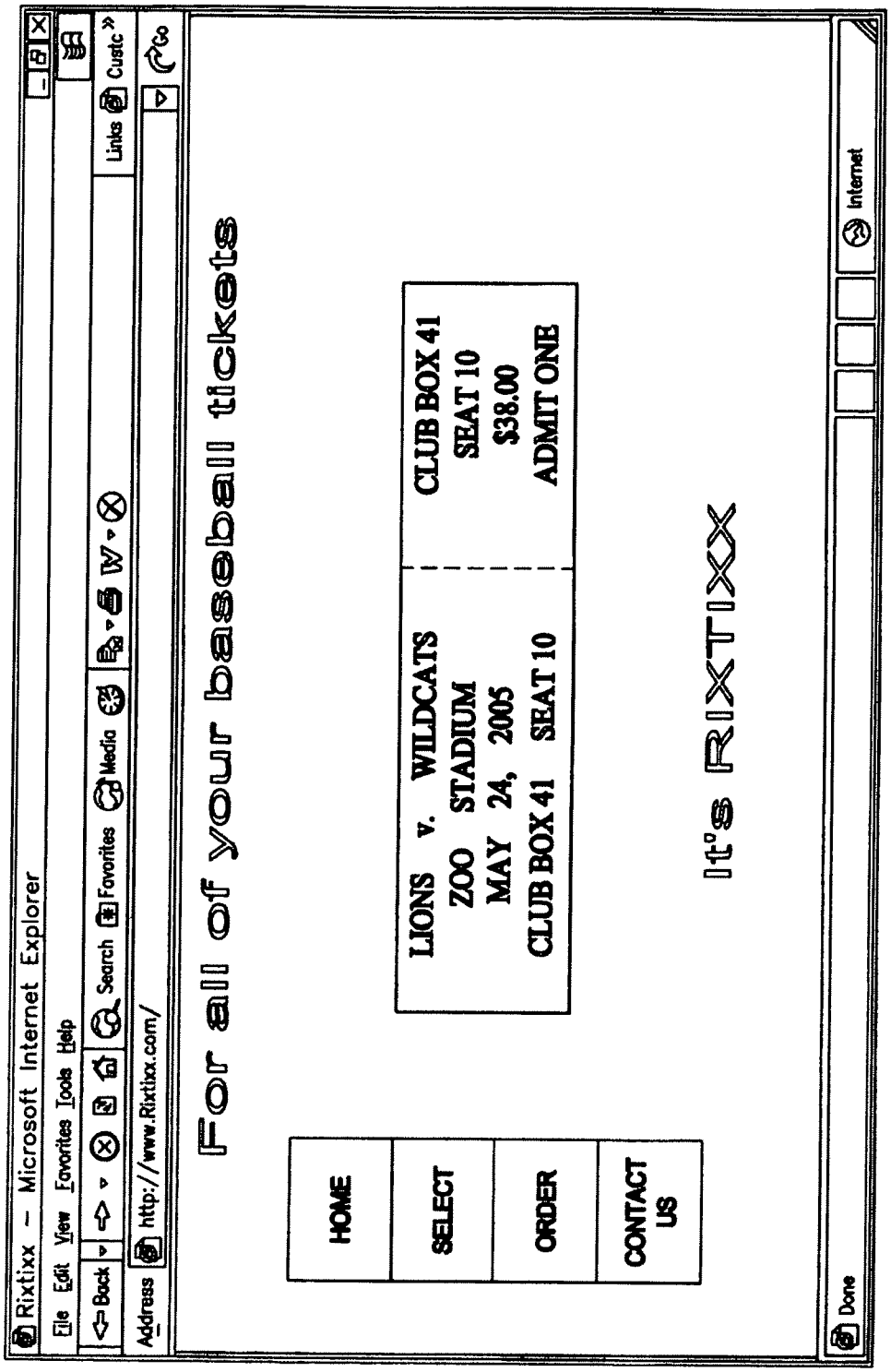

Once the landing page is created, the browser of the user is directed to a data object, typically the now created landing page, at block 508 (similar to block 108 as detailed above). Turning also to FIG. 13B, for example, when the respective listing 595a-595e on the landing page 591 is activated or "clicked" (as shown by the arrow 597), the corresponding link is activated, and the browser of the user is directed to the targeted web site, associated with the listing and link.

For example, in FIG. 13B, the user 40 seeks the listing for Rix Tixx, a business selling baseball game tickets. Upon clicking on the listing 595e, the underlying link is activated, this activation creating electronic data that is input, and is received in the home server (HS) 30. With the input received, the browser of the user is redirected to a second data object, typically, a targeted web site associated with the listing and underlying link, at block 110. For example, the underlying link for the browser redirect would include the URL for the targeted web site, here for example for Rix Tixx, www.rixtixx.com, illustrated by the exemplary screen shot of FIG. 14.

The above described methods (processes), including portions thereof, can be performed by software, hardware and combinations thereof. These processes and portions thereof can be performed by computers, computer-type devices, workstations, processors, micro-processors, other electronic searching tools and memory and other storage-type devices associated therewith. The processes and portions thereof can also be embodied in programmable storage devices, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

While preferred embodiments of the present invention have been described, so as to enable one of skill in the art to practice the present invention, the preceding description is intended to be exemplary only. It should not be used to limit the scope of the invention, which should be determined by reference to the following claims.

What is claimed is:

1. A computer implemented method comprising:
composing, by one or more servers having an associated first uniform resource locator (URL) address, a plurality of activatable electronic mail (e-mail) to be sent to a plurality of computers connected to a network, wherein each of the plurality of activatable e-mails comprises an e-mail body or a banner having an activatable location arranged within the e-mail body or banner, wherein the activatable location has an associated e-mail identifier and comprises a URL link to a given dynamically generated landing page to be generated by the one or more servers based on the e-mail identifier, wherein the e-mail identifier is sent back to the one or more servers by a computer of the plurality of computers via a response that is created at a time instance in which the activatable location is activated by a mouse input or a pointing device input received at the activatable location of the e-mail body or banner, wherein the URL link of the activatable location is based on the first URL address, wherein each of the plurality of activatable e-mails comprises a generic message that does not identify any marks or brands of a vendor or advertiser by identifying only a category of goods or services, and wherein activation of the activatable location causes a browser application to be initiated at the computer;

sending, from the one or more servers, through the network, to the plurality of computers, the plurality of generated activatable e-mails, wherein the one or more servers as a sender is not associated with a third-party targeted website;

upon receipt at the one or more servers of a transmitted response from the computer at which the activatable location of an activatable e-mail has been activated, matching, by the one or more servers, a received e-mail identifier located within the transmitted response with a corresponding e-mail-text identifier indexed in one or more databases accessible to the one or more servers;

retrieving, by the one or more servers, e-mail text from the one or more databases using the matched e-mail-text identifier;

searching, by the one or more servers, the one or more databases, using one or more of the retrieved e-mail text as one or more keywords of the search, for one or more corresponding URL links to one or more corresponding third-party targeted websites and for one or more contents to be included in a dynamically generated landing page using a template, wherein the one or more corresponding third-party targeted web sites each has a second set of associated URL addresses different from the first URL address, and wherein the one or more corresponding third-party targeted web sites include marks or brands of a vendor or advertiser associated with the category of goods or services;

retrieving, by the one or more servers, from the search, the one or more contents for the dynamically generated landing page, wherein each of the one or more contents is retrieved as a text formatted data;

converting, by the one or more servers, in part, each of the one or more retrieved text formatted data of the search into rendered text in an image to generate one or more rendered images, wherein the one or more rendered images and the one or more corresponding URL links to the one or more corresponding third-party targeted websites are filled, as listings, in one of one or more selected landing page templates to generate the dynamically generated landing page;

retrieving, by the one or more servers, a landing page template identifier from the one or more databases using the received e-mail identifier;

retrieving, by the one or more servers, the one of the one or more selected landing page templates from the one or more databases using the retrieved landing page template identifier;

filling, by the one or more servers, a retrieved landing page template with the one or more rendered images at one or more listing locations located in the retrieved landing page template to generate the dynamically generated landing page, wherein each of the one or more dynamically generated listing locations is associated with a second URL link of the second set of associated URL addresses to a third-party targeted web site; and transmitting, by the one or more servers, the dynamically generated landing page as a data object to the browser application executing at the computer at which the activatable location of an activatable e-mail has been activated, wherein the data object associated with the dynamically generated landing page is transmitted contemporaneously and immediately after receipt of the transmitted response at the one or more servers, wherein the first mouse input or point device input causes the presented generic message in the e-mail body or banner, which does not identify any marks or brands of a vendor of advertiser by identifying only a category of goods or services, to open the browser application to the dynamically generated landing page that includes the one or more dynamically generated listing locations, and wherein a second mouse input or a second pointing device input received at the browser application at a dynamically generated listing location of the one or more dynamically generated listing locations redirects the browser application to the second URL link associated with the third-party targeted website, which includes marks or brands of a vendor or advertiser associated with the category of goods or services.

2. The method of claim 1, wherein the dynamically generated landing page is hosted by a first server of the one or more servers, and wherein the third-party targeted web site is hosted by a second server external to the one or more servers.

3. A system comprising:
one or more computing devices, each comprising:
a processor; and
a memory having instructions stored thereon, wherein the instructions, when executed by the processors of the one or more computing devices, cause the processors, collectively, to:
compose a plurality of activatable electronic mail (e-mail) to be sent to a plurality of computers connected to a network, wherein each of the plurality of activatable e-mails comprises an e-mail body or a banner having an activatable location arranged within the e-mail body or banner, wherein the activatable location has an associated e-mail identifier and comprises a URL link to a given dynamically generated landing page to be generated by the one or more computing devices based on the e-mail identifier, wherein the e-mail identifier is sent back to the one or more computing devices by a computer of the plurality of computers via a response that is created at a time instance in which the activatable location is activated by a mouse input or a pointing device input received at the activatable location of the e-mail body or banner, wherein the URL link of the activatable location is based on the first URL address, wherein each of the plurality of activatable e-mails comprises a generic message that does not identify any marks or brands of a vendor or advertiser by identifying only a category of goods or services, and wherein activation of the activatable location causes a browser application to be initiated at the computer;
send, through the network, to the plurality of computers, the plurality of generated activatable e-mails, wherein the one or more computers as a sender is not associated with a third-party targeted website;
upon receipt of a transmitted response from the computer at which the activatable location of an activatable e-mail has been activated, match a received e-mail identifier located within the transmitted response with a corresponding e-mail-text identifier indexed in one or more databases accessible to the one or more computing devices;
retrieve e-mail text from the one or more databases using the matched e-mail text identifier;

search the one or more databases using one or more of the retrieved e-mail text as one or more keywords of the search, for one or more corresponding URL links to one or more corresponding third-party targeted websites and for one or more contents to be included in a dynamically generated landing page using a template, wherein the one or more corresponding third-party targeted websites each has a second set of associated URL addresses different from the first URL address, and wherein the one or more corresponding third-party targeted websites include marks or brands of a vendor or advertiser associated with the category of goods or services;

retrieve, from the search, the one or more contents for the dynamically generated landing page, wherein each of the one or more contents is retrieved as a text formatted data;

convert, in part, each of the one or more retrieved text formatted data of the search into rendered text in an image to generate one or more rendered images, wherein the one or more rendered images and the one or more corresponding URL links to the one or more corresponding third-party targeted websites are filled, as listings, in one of one or more selected landing page templates to generate the dynamically generated landing page;

retrieve a landing page template from the one or more databases using the received e-mail identifier;

fill the retrieved landing page template with the one or more rendered images at one or more listing locations located in the retrieved landing page template to generate the dynamically generated landing page, wherein each of the one or more listing locations is associated with a second URL link of the second set of associated URL addresses to a third-party targeted website; and transmit the dynamically generated landing page as a data object to the browser application executing at the computer at which the activatable location of an activatable e-mail has been activated, wherein the data object associated with the dynamically generated landing page is transmitted contemporaneously and immediately after receipt of the transmitted response at the one or more computing devices, wherein the first mouse input or point device input causes the presented generic message in the e-mail body or banner, which does not identify any marks or brands of a vendor of advertiser by identifying only a category of goods or services, to open the browser application to the dynamically generated landing page that includes the one or more dynamically generated listing locations, and wherein a second mouse input or a second pointing device input received at the browser application at a listing locations of the one or more listing locations redirects the browser application to second URL link associated with the third-party targeted website, which includes marks or brands of a vendor or advertiser associated with the category of goods or services.

4. A non-transitory computer readable medium, having instructions stored thereon that, when executed by one or more computing devices, cause the one or more computing devices to at least collectively:

compose a plurality of activatable electronic mail (e-mail) to be sent to a plurality of computers connected to a network, wherein each of the plurality of activatable e-mails comprises an e-mail body or a banner having an activatable location arranged within the e-mail body or banner, wherein the activatable location has an associated e-mail identifier and comprises a URL link to a given dynamically generated landing page to be generated by the one or more computing devices based on the e-mail identifier, wherein the e-mail identifier is sent back to the one or more computing devices by a computer of the plurality of computers via a response that is created at a time instance in which the activatable location is activated by a mouse input or a pointing device input received at the activatable location of the e-mail body or banner, wherein the URL link of the activatable location is based on the first URL address, wherein each of the plurality of activatable e-mails comprises a generic message that does not identify any marks or brands of a vendor or advertiser by identifying only a category of goods or services, and wherein activation of the activatable location causes a browser application to be initiated at the computer;

send, through the network, to the plurality of computers, the plurality of generated activatable e-mails, wherein the one or more computers as a sender is not associated with a third-party targeted website;

upon receipt of a transmitted response from the computer at which the activatable location of an activatable e-mail has been activated, match a received e-mail identifier located within the transmitted response with a corresponding e-mail text identifier indexed in one or more databases accessible to the one or more computing devices;

retrieve e-mail text from the one or more databases using the matched e-mail text identifier;

search the one or more databases using one or more of the retrieved e-mail text as one or more keywords of the search, for one or more corresponding URL links to one or more corresponding third-party targeted websites and for one or more contents to be included in a dynamically generated landing page using a template, wherein the one or more corresponding third-party targeted web sites each has a second set of associated URL addresses different from the first URL address, and wherein the one or more corresponding third-party targeted web sites include marks or brands of a vendor or advertiser associated with the category of goods or services;

retrieve, from the search, the one or more contents for the dynamically generated landing page, wherein each of the one or more contents is retrieved as a text formatted data;

convert, in part, each of the one or more retrieved text formatted data of the search into rendered text in an image to generate one or more rendered images, wherein the one or more rendered images and the one or more corresponding URL links to the one or more corresponding third-party targeted websites are filled, as listings, in one of one or more selected landing page templates to generate the dynamically generated landing page;

retrieve a landing page templates from the one or more databases using the received e-mail identifier;

fill the retrieved landing page template with the one or more rendered images at one or more listing locations located in the retrieved landing page template to generate the dynamically generated landing page, wherein each of the one or more listing locations is associated with a second URL link of the second set of associated URL addresses to a third-party targeted web site; and transmit the dynamically generated landing page as a data object to the browser application executing at the computer at which the activatable location of an activatable e-mail has been activated, wherein the data object associated with the dynamically generated landing page is transmitted contemporaneously and immediately after receipt of the transmitted response at the one or more computing devices, wherein the first mouse input or point device input causes the presented generic message in the e-mail body or banner, which does not identify any marks or brands of a vendor of advertiser by identifying only a category of goods or services, to open the browser application to the dynamically generated landing page that includes the one or more dynamically generated listing locations, and wherein a second mouse input or a second pointing device input received at the browser application at a listing locations of the one or more listing locations redirects the browser application to second URL link associated with the third-party targeted website, which includes marks or brands of a vendor or advertiser associated with the category of goods or services.

5. The non-transitory computer readable medium of claim 4, wherein the dynamically generated landing page is hosted by a first server of the one or more computing devices, and the third-party target websites are hosted by one or more other servers.

6. The system of claim 3, wherein the dynamically generated landing page is hosted by a first server of the one or more computing devices, and the third-party target websites are hosted by one or more other servers.

7. The computer implemented method of claim 1, wherein the steps of searching, retrieving, and converting by the one or more servers are performed contemporaneous and immediately after receipt of the transmitted response at the one or more servers.

8. The computer implemented method of claim 1, further comprising:
the one or more servers caching, for a given keyword, one or more cached listings for a dynamically generated landing page, wherein each of the cached listings includes i) the one or more rendered images for the one or more listing locations in the dynamically generated landing page and ii) the corresponding second URL link to the third-party targeted website.

9. The computer implemented method of claim 8, further comprising:
the one or more servers transmitting a same cached listing of the one or more cached listings to more than one computers of the plurality of computers in response to receipt at the one or more servers of transmitted responses received from the more than one computers.

10. The computer implemented method of claim 9, wherein the same cached listing are reordered among the plurality of dynamically generated landing pages generated for the more than one computers.

11. The computer implemented method of claim 1, wherein the step of generating the plurality of activatable electronic mail is performed by a first set of servers of the one or more servers; and
wherein the step of sending the plurality of generated activatable e-mails is performed by the first set of servers.

12. The computer implemented method of claim 11, wherein the step of matching the received e-mail identifier to the e-mail text identifier is performed by the first set of servers.

13. The computer implemented method of claim 12, wherein the step of filling the dynamically generated landing page template with the one or more rendered images is performed by the first set of servers.

14. The computer implemented method of claim 13, wherein the step of retrieving the e-mail text from the one or more databases is performed by the first set of servers.

15. The computer implemented method of claim 1, wherein the step of searching for the one or more corresponding URL links and for the one or more contents is performed by a second set of servers of the one or more servers.

16. The computer implemented method of claim 15, wherein the step of converting the one or more retrieved text formatted data into rendered text is performed by a third set of servers of the one or more servers.

17. The system of claim 3, wherein the instructions, when executed by the processors of the one or more of the one or more computing devices, further cause the processors to:
cache, for a given keyword, one or more cached listings for a dynamically generated landing page, wherein the cached listing includes i) the one or more rendered images for the one or more listing locations in the dynamically generated landing page and ii) the corresponding second URL link to the third-party targeted website.

18. The system of claim 17, wherein the instructions, when executed by the processors of the one or more of the one or more computing devices, further cause the processors to:
transmit a same cached listing of the one or more cached listings to more than one computers of the plurality of computers in response to receipt at the one or more computing devices of transmitted responses received from the more than one computers.

19. The system of claim 18, wherein the same cached listing are reordered among the plurality of dynamically generated landing pages generated for the more than one computers.

20. The system of claim 3, wherein the one or more computing devices comprise one or more home servers, one or more content servers, and one or more image servers.

* * * * *